US011922751B2

(12) United States Patent
Dusterhus et al.

(10) Patent No.: US 11,922,751 B2
(45) Date of Patent: Mar. 5, 2024

(54) APPARATUS FOR HANDLING VALUE DOCUMENTS

(71) Applicant: Wincor Nixdorf International GmbH, Paderborn (DE)

(72) Inventors: Richard Dusterhus, Paderborn (DE); Gerhard Schniedermann, Paderborn (DE)

(73) Assignee: Diebold Nixdorf Systems GmbH, Paderborn (DE)

( * ) Notice: Subject to any disclaimer, the term of this patent is extended or adjusted under 35 U.S.C. 154(b) by 26 days.

(21) Appl. No.: 17/762,042

(22) PCT Filed: Sep. 24, 2020

(86) PCT No.: PCT/EP2020/076663
§ 371 (c)(1),
(2) Date: Oct. 14, 2022

(87) PCT Pub. No.: WO2021/058625
PCT Pub. Date: Apr. 1, 2021

(65) Prior Publication Data

US 2023/0058130 A1 Feb. 23, 2023

(30) Foreign Application Priority Data

Sep. 26, 2019 (DE) ........................ 102019125995.9

(51) Int. Cl.
*G07D 11/14* (2019.01)
*G07D 11/235* (2019.01)
*G07F 19/00* (2006.01)

(52) U.S. Cl.
CPC ........... *G07D 11/14* (2019.01); *G07D 11/235* (2019.01); *G07F 19/205* (2013.01)

(58) Field of Classification Search
CPC ...... G07D 11/14; G07D 11/235; G07F 19/205
See application file for complete search history.

(56) References Cited

U.S. PATENT DOCUMENTS

2008/0142583 A1 6/2008 Yokoi
2009/0194387 A1 * 8/2009 Herd ....................... G07F 19/20
194/344

(Continued)

FOREIGN PATENT DOCUMENTS

CN 107464338 A 12/2017
DE 102009035938 A1 2/2011

OTHER PUBLICATIONS

International Search Report filed in the corresponding PCT Application dated Jan. 19, 2021 written in the German language; 4 pages.

(Continued)

*Primary Examiner* — Sonji N Johnson
(74) *Attorney, Agent, or Firm* — Black McCuskey

(57) ABSTRACT

A device for handling value documents, comprises a value document dispensing unit with a dispensing compartment for dispensing value documents and with a first closure element which in a closed position delimits the dispensing compartment on one side. The first closure element is movable from the closed position into an open position to open the dispensing compartment, and from the open position into the closed position to close the dispensing compartment. The device comprises at least one second closure element, which is movable from an open position into a closed position and from the closed position into the open position. The second closure element is arranged in such a way that access to value documents provided in the dispensing compartment is only possible if both the first closure element and the second closure element are in their open positions.

13 Claims, 22 Drawing Sheets

(56) References Cited

U.S. PATENT DOCUMENTS

| | | | | |
|---|---|---|---|---|
| 2013/0015035 | A1 | 1/2013 | Tanaka | |
| 2017/0270736 | A1 | 9/2017 | Saiki | |
| 2019/0103000 | A1 * | 4/2019 | Jones | G07D 11/60 |
| 2019/0333307 | A1 * | 10/2019 | Grant | G06Q 20/18 |

OTHER PUBLICATIONS

International Search Report filed in the corresponding PCT Application dated Jan. 19, 2021 translated to the English language; 2 pages.

Written Opinion filed in the corresponding PCT Application dated Jan. 19, 2021 written in the German language; 6 pages.

* cited by examiner

APPARATUS FOR HANDLING VALUE DOCUMENTS

The invention relates to a device for handling bills, having a bill dispensing unit which comprises a dispensing compartment for dispensing bills and a first closure element. The first closure element in a closed position delimits the dispensing compartment on one side, and for opening the dispensing compartment is movable from the closed position to an opened position, and for closing the dispensing compartment is movable from the opened position to the closed position.

The closure element of the bill dispensing unit can be, in particular forcibly, opened by criminals in such a manner that the latter gain access to the dispensing compartment and are able to manipulate the latter. In this way, so-called cash-trapping elements, in particular pliers, for the unauthorized retrieval of bills can be introduced into the dispensing unit, for example. Furthermore, an ignitable mixture, for example air and propane gas, or air and acetylene, can also be directed into the strongbox module by the dispensing compartment and cause an explosion. Alternatively, solid explosives or pyrotechnics are also used.

Solutions in which camera units monitor the automatic teller machine are known from the prior art. For example, from document DE 10 2011 010 737 A1 it is known for an image of the automatic teller machine to be recorded with the aid of a camera and for said image to be compared with a default image at predefined temporal intervals and/or after objects have moved in the region in front of the ATM. By comparing the images it can be established whether the closure element of the automatic teller machine has been manipulated.

Defensive measures in which so-called ink hits or dye bombs are used as anti-theft measures are furthermore known from the prior art. In the event of an unauthorized opening of the strongbox module, the ink hit is triggered in such a manner that the bill content is rendered useless to the perpetrators by a dye. However, these measures have the disadvantage that the detonation per se and the damage and risks associated therewith are not avoided.

It is an object of the invention to specify a device for handling bills which prevents unauthorized access to the dispensing compartment.

This object is achieved by a device having the features disclosed herein. Advantageous refinements are set forth also.

A device can comprise at least one second closure element which is movable from an opened or open position to a closed position and from the closed position to the opened position. The second closure element is disposed in such a manner that access to bills provided in the dispensing compartment is possible only when the first closure element and the second closure element are in their respective opened position. A particularly secure closure of the dispensing compartment is achieved as a result.

It is advantageous for the device to comprise a first drive unit for selectively moving the first closure element from the closed position to the opened position and from the opened position to the closed position, and a second drive unit for selectively moving the second closure element from the closed position to the opened position and from the opened position to the closed position. As a result, it is achieved that the first closure element and the second closure element are movable in a mutually independent manner.

It is furthermore advantageous for the device to comprise a control unit which is configured to actuate the first drive unit independently of the second drive unit, and/or to actuate the second drive unit independently of the first drive unit. A high degree of security is achieved as a result of this independent actuation.

It is particularly advantageous for the first closure element and the second closure element not to be mechanically coupled. It is achieved as a result that any manipulation of the second closure element does not affect the first closure element.

In one preferred embodiment the second closure element in the closed position forms a region of the surface of a closure unit of the device. A compact disposal of the second closure element within the device is achieved as a result.

It is advantageous for the first and/or the second closure element during the movement from the closed position to the opened position, and during the movement from the opened position to the closed position, to be guided in at least one guide track. A reliable and consistent movement of the closure elements is ensured as a result.

It is furthermore advantageous for the closure unit to comprise an opening which is able to be closed by the second closure element and behind which the bill dispensing unit is disposed. A space-saving disposal of the bill dispensing unit within the closure unit is ensured as a result.

It is particularly advantageous for the bill dispensing unit with the aid of at least one fastening means, in particular by way of a frame of the device, to be fixedly connected to the closure unit. A secure connection between the bill dispensing unit and the closure unit is achieved as a result.

In one advantageous embodiment the first closure element is pivotable about a first rotation axis, and the second closure element is pivotable about a second rotation axis which is different from the first rotation axis. A flexible construction of the device is achieved as a result.

In an alternative advantageous embodiment the first closure element and the second closure element are pivotable about a common rotation axis. A disposal of the two closure elements that saves installation space is achieved as a result.

It is furthermore advantageous for the first closure element in the closure position to serve as a detent element for the bills fed individually to the dispensing compartment. Orderly depositing of the bills in the dispensing compartment is ensured as a result.

It is advantageous for the first closure element and/or the second closure element to comprise a metal layer, in particular a stainless steel layer, and/or a metal element or a metal sheet, which has in particular been produced by a die casting method, in particular a metal element produced by means of aluminium die casting, zinc die casting or magnesium die casting, wherein cast alloys with a low melting point, in particular aluminium alloys, zinc alloys or magnesium alloys are preferably used. As a result, a simple and cost-effective production method for the closure elements is used, wherein the closure elements thus produced have a high flexural strength and can preferably resist high temperatures.

It is furthermore advantageous for the first closure element and/or the second closure element to be produced from a plastics material, in particular from an electrically conducting plastics material. A cost-effective production of the closure element is possible as a result.

In one particularly preferred embodiment at least one first sensor unit for detecting a position, in particular the opened or the closed position, of the first closure element is provided, and/or at least one second sensor unit for detecting a position, in particular the opened or the closed position, of the second closure element is provided. It is advantageous for the first sensor unit to generate a sensor signal when the first closure element is situated in the opened or in the closed position, and for the second sensor unit to generate a sensor signal when the second closure element is situated in the opened or in the closed position. The first sensor unit and/or the second sensor unit preferably transmit(s) the sensor signal to the control unit, wherein the control unit is configured to actuate the first drive unit and/or the second drive unit as a function of the transmitted sensor signal. Reliable monitoring of the position of the closure elements and simple and rapid controlling of the movement of the closure elements are achieved as a result.

It is particularly advantageous for the control unit to actuate the first drive unit in such a manner that the latter moves the first closure element to the closed position, or that the first closure element remains in the closed position, when the control unit actuates the second drive unit for moving the second closure element from the opened to the closed position and the second sensor unit after a predetermined temporal interval does not detect the closed position of the second closure element. A high degree of security is achieved as a result, in particular when the second closure element is manipulated.

In one further advantageous embodiment the control unit actuates the second drive unit for moving the second closure element in such a manner that the said drive unit moves the second closure element to the closed position, or that the second closure element remains in the closed position when the control unit actuates the first drive unit for moving the first closure element from the opened to the closed position and the first sensor unit after a predetermined temporal interval does not detect the closed position of the first closure element. A high degree of security is achieved as a result, in particular when the first closure element is manipulated.

Further features and advantages are derived from the description hereunder which in conjunction with the appended figures explains exemplary embodiments in more detail.

IN THE FIGURES

FIGS. 2 to 15, is suitable for use in the device as per FIG. 1;

Figure 1:
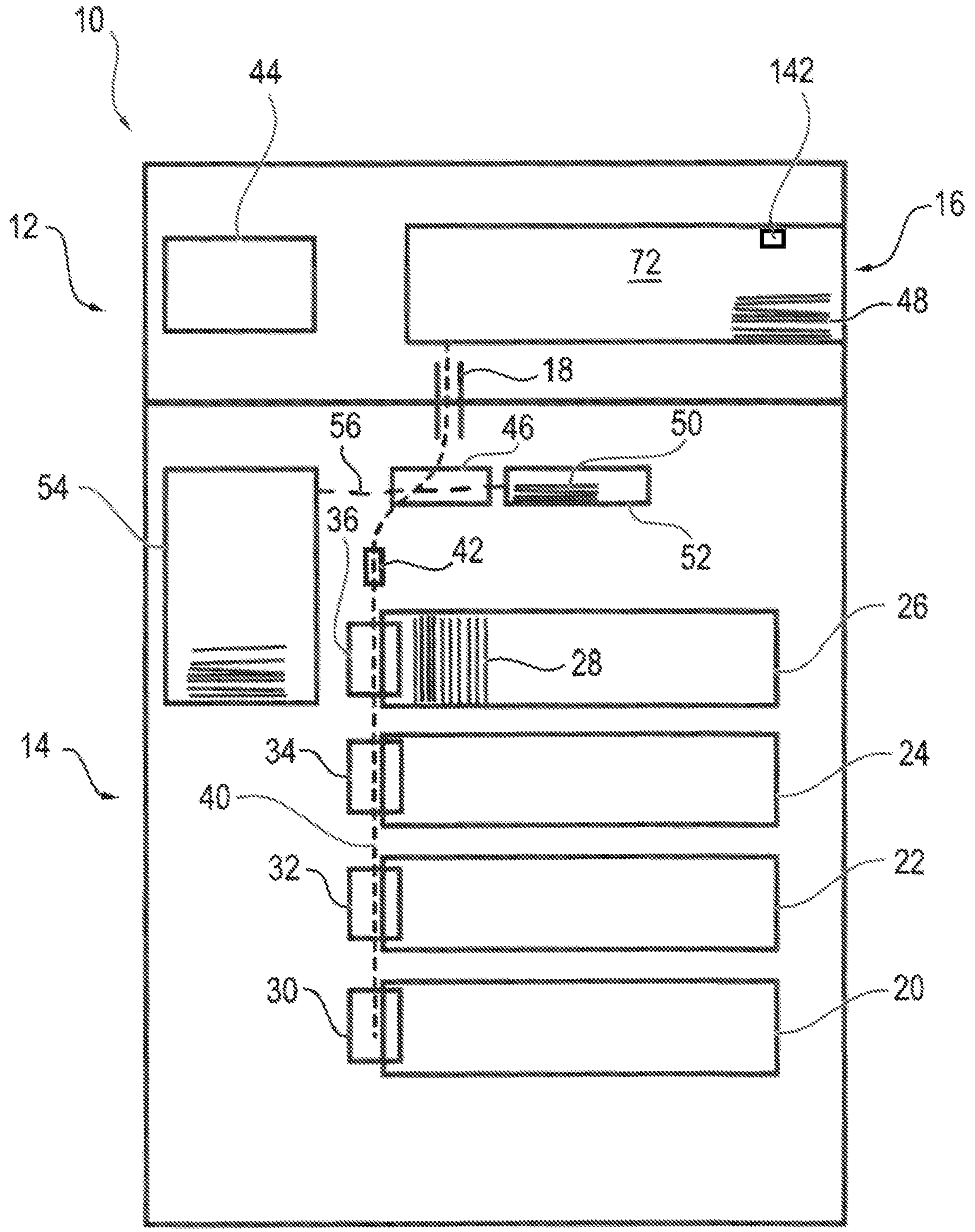
FIG. 1 shows a schematic illustration of a device for handling bills.

FIG. 1 shows a schematic illustration of a device 10 for handling bills 28, 48, 50. The device 10 comprises a head module 12 and a strongbox module 14. The head module 12 comprises a bill dispensing unit 16 for dispensing bills 48 to be disbursed to an operator. Bills 28, 48 are transported from the strongbox module 14 into the head module 12 by way of a transfer opening 18. The strongbox module 14 comprises four bill cassettes 20 to 26 which serve for storing and for transporting bills 28.

The bills 28 are deposited in the form of a stack in the bill cassettes 20 to 26. One of these stacks is indicated in an exemplary manner in the first bill cassette 26. In an exemplary manner, one of the bills of this bill stack is identified by the reference sign 28. In the operating position of the bill cassettes 20 to 26 shown in FIG. 1, the bills 28 are disposed in the bill cassettes 20 to 26 so as to be upright on one of the edges of said bills 28. Each bill cassette 20 to 26 has in each case one opening, not illustrated, for retrieving bills 28. A singularizing unit 30 to 36, with the aid of which the bills 28 stored in the bill cassettes 20 to 26 can be retrieved and singularized as a result, is disposed in front of the opening.

As soon as a user initiates a disbursement procedure, bills 28 to be disbursed are retrieved from the corresponding bill cassettes 20 to 26 and, after singularizing, are fed to a transport path 40. A sensor unit 42 is disposed along the transport path 40 and detects at least one feature of each bill 28 to be disbursed. The sensor unit 42 transmits a measured value of the detected feature to a control unit 44 which, as a function of the detected feature, is configured to evaluate whether the bill 28 is a first bill 48 cleared for disbursement or a second bill 50 not cleared for disbursement.

The control unit 44 actuates a turnout unit 46 in such a manner that the bill 48 is fed to the bill dispensing unit 16 when said bill 48 is a bill 48 cleared for disbursement.

However, if the bill is a bill 50 not cleared for disbursement, the control unit 44 actuates the turnout unit 46 in such a manner that the bill 50 is fed to an intermediate storage 52.

In order not to unnecessarily delay the disbursement procedure for the operator, replacement bills for the bills 50 not cleared for disbursement are retrieved from the bill cassettes 20 to 26 and, to the extent that said replacement bills by virtue of the features detected with the aid of the sensor unit 42 are cleared for disbursement, are transported to the bill dispensing unit 16. In this way, the desired total value can be dispensed to the operator without interrupting the disbursement procedure. Upon completion of the disbursement procedure the bills 50 not cleared for disbursement, by way of a further transport path 56, are fed to a container 54, in particular to a so-called reject and retract container 54 which is preferably configured in the form of a further bill cassette.

The reject and retract container 54 comprises in particular a first compartment for receiving the rejected bills 50 (so-called rejects) and a second compartment, separate from the first compartment, for receiving bills 48 not retrieved from the dispensing compartment (so-called retracts). In this way, the rejects and the retracts can be separately stored, as a result of which tracing the notes is easily possible.

In an alternative embodiment, the device 10 can be configured as an automatic recycling cash machine, i.e. as a device 10 for disbursing and depositing bills 28. In this embodiment the sensor unit 42, or a further sensor unit which is in particular disposed in the head module, also checks the features of the bills 28 which by way of a bills dispensing and depositing unit are fed to the device 10 by an operator. Bills 28 cleared for depositing are fed to the bill cassettes 20 to 26, while bills not cleared for depositing are fed to the intermediate storage 52. The device 10 in other embodiments can comprise a larger or smaller number of bill cassettes 20 to 26, as well as separate reject and retract containers 54.

Figure 2:
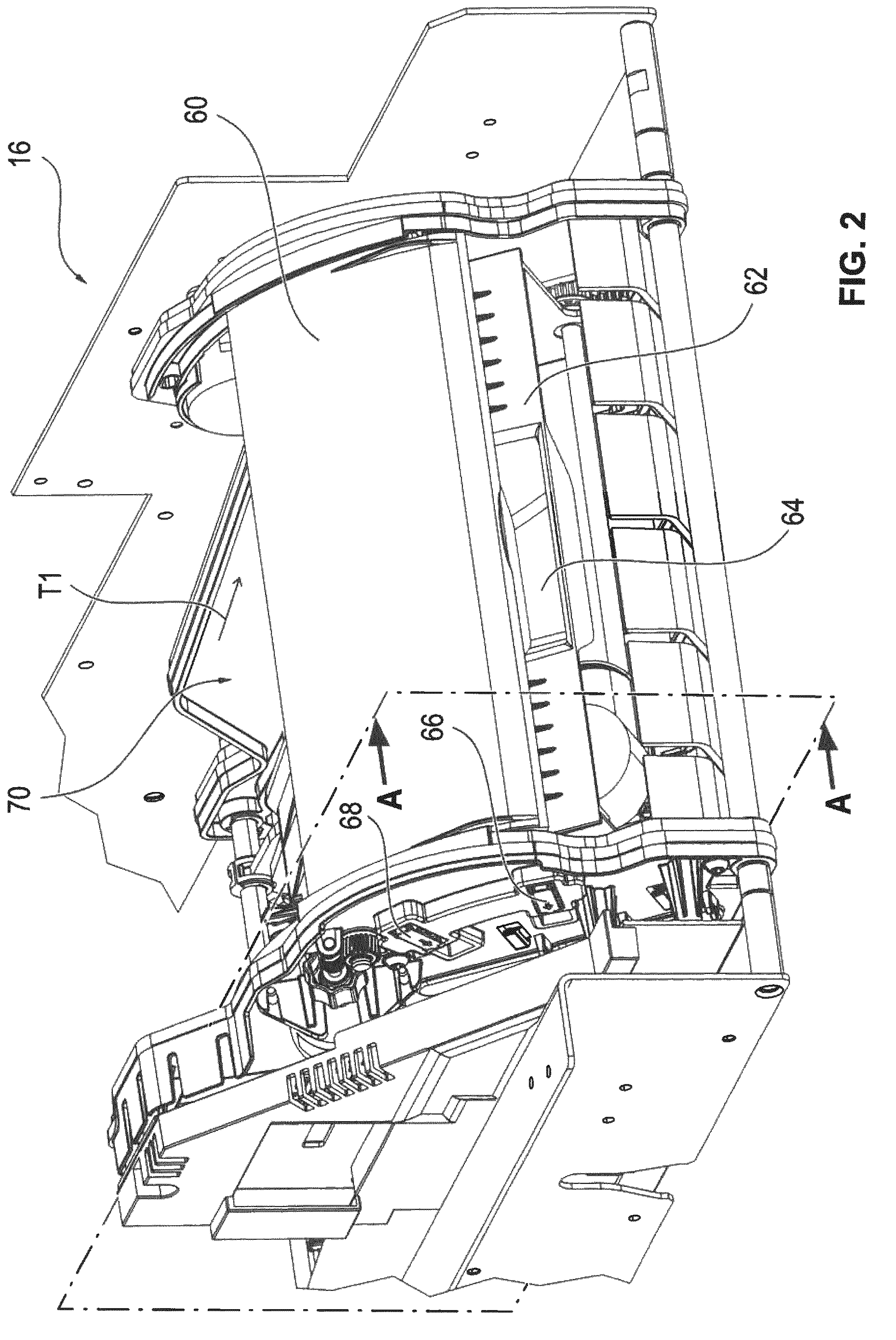
FIG. 2 shows a perspective detailed view of a bill dispensing unit according to a first embodiment, having a closed closure element for use in the device for handling bills as per FIG. 1.

FIG. 2 shows a perspective detailed view of the bill dispensing unit 16 of the device, having a closed closure element 60. Elements of identical construction or identical function have the same reference signs. The closure element 60 delimits a dispensing compartment which in the illustration of FIG. 2 is obscured by the closure element 60 and in which the bills 48 destined for disbursement are provided for retrieval by an operator. The dispensing compartment is identified by the reference sign 72 in FIG. 3 and will be described in more detail hereunder. In the closed position of the closure element 60 illustrated in FIG. 2, no access to the dispensing compartment 72 and to bills 48 provided therein is possible.

A depositing element 62 for depositing the bills 48 provided for disbursement can be seen in the illustration as per FIG. 2. The depositing element 62 comprises a clearance 64 which is disposed in such a manner that the bills 48 deposited in the dispensing compartment 72 lie above a sub-region of the clearance 64. In the opened position of the closure element 60, access to the bills 48 is facilitated in that an operator can reach into the clearance 64 and below the bills 48 with his/her fingers.

Further to be seen in FIG. 2 are two sensor units 66, 68, wherein the sensor unit 66 is provided for detecting the closed position of the closure element 60, and the sensor unit 68 is provided for detecting an opened position of the closure element 60. The sensor units 66, 68 when detecting the respective position of the closure element 60 generate a sensor signal and transmit this sensor signal to the control unit 44. The sensor unit 44 is configured to actuate a drive unit, not visible in FIG. 2, for moving the closure element 60 as a function of the transmitted sensor signal.

The bill dispensing unit 16 furthermore comprises a transport unit 70 with the aid of which the bills 48 retrieved from the strongbox module 14 are transported in a direction T1 to the dispensing compartment 72. Those bills not retrieved from the dispensing compartment 72, with the aid of the transport unit 70 are transported in a direction counter to the direction T1.

The closure element 60 is a first inner closure element of the device 10 which as a “shadow” closure element 60 is disposed behind a second outer closure element, not illustrated in FIG. 2. The construction and the function of the outer closure element will be explained in more detail hereunder in the context of FIGS. 12 to 16. The outer closure element 260 can be opened and closed independently of the closure element 60. In this way, the retrieval of bills 48 from the bill dispensing unit 16 is possible only when both closure elements 60 are simultaneously opened. A particularly high degree of security is achieved as a result because the inner “shadow” closure element 60 remains closed in particular when the outer closure element 260 is manipulated by any unauthorized third party.

Figure 3:
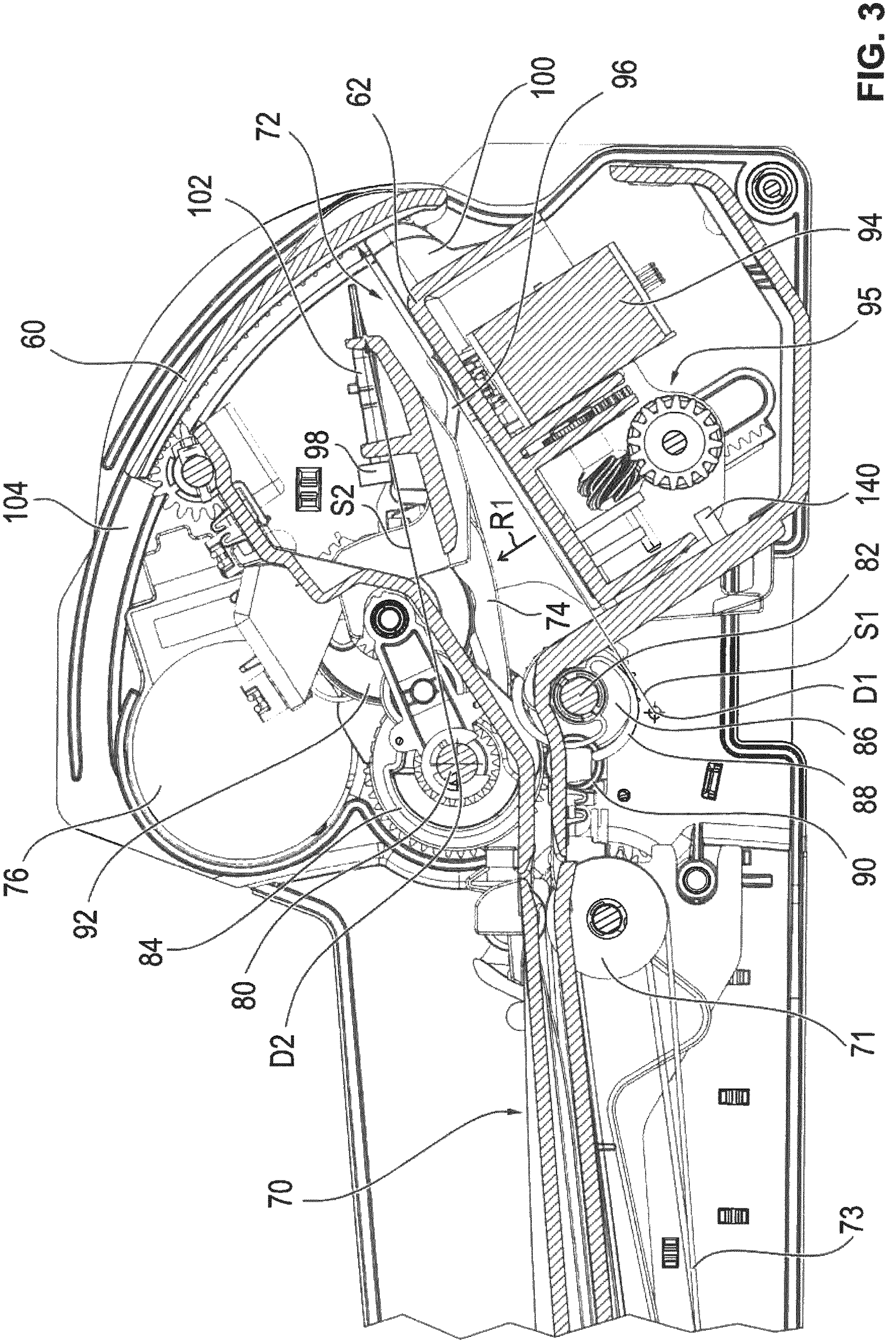
FIG. 3 shows a sectional illustration of a fragment of the bill dispensing unit as per FIG. 2.

FIG. 3 shows a sectional illustration of a fragment of the bill dispensing unit 16 as per FIG. 2 along the section plane A. During a disbursement procedure the bills 48 are first transported in the direction of the dispensing compartment 72 by way of two transport belts which are in each case deflected by two deflection rollers, wherein the transport belt 73 and the deflection roller 71 are visible in the sectional illustration as per FIG. 3. Subsequently, the bills 48 are fed to further transport elements 80 to 90 with the aid of which the bills 48 are fed, preferably individually, to the dispensing compartment 72. The transport elements 80 to 90 comprise transport rollers, rotary blades and contact pressure rollers, wherein the transport roller 84 disposed on the shaft 80, the transport roller 86 disposed on the shaft 82, and the rotary blade 88 as well as the contact pressure roller 90 are visible in the illustration as per FIG. 3. The shafts 80 and 82 are interconnected by a gearbox assembly not visible in FIG. 3 and are driven with the aid of the drive unit 76.

When feeding the bills 48 into the dispensing compartment 72, the drive unit 76 is actuated by the control unit 44 in such a manner that the shafts 80 and 82 are in each case driven in a first rotating direction. In particular, the shaft 80 rotates in a counter-clockwise manner, and the shaft 82 correspondingly rotates in a clockwise manner, so that the bill 48 is fed to the dispensing compartment 72.

If the bills 48 are not retrieved from the device 10, the so-called retracts from the dispensing compartment 72 are fed to the reject and retract container 54. The retrieval takes place with the aid of discharge rollers 92 which ensure that the bills 48 are retrieved, preferably individually or alternatively as a stack, from the dispensing compartment 72. When retrieving the bills 48 from the dispensing compartment 72, the shafts 80 and 82 are in each case driven in a second rotating direction. In particular, the shaft 80 rotates in a clockwise manner, and the shaft 82 correspondingly rotates in a counter-clockwise manner, so as to retrieve the bill 48 from the dispensing compartment 72.

The dispensing compartment 72 on a first side is delimited by the depositing element 62, and on a second side is delimited by a delimiting element 74. The delimiting element 74 comprises two contact pressure elements for the orderly depositing of the bills 48, wherein only the contact pressure element 96 is visible in the illustration as per FIG. 3 while the second contact pressure element 97 is illustrated in FIGS. 4, 6, 9 and 10. The description hereunder pertaining to the contact pressure element 96 applies in an analogous manner also to the contact pressure element 97 which in terms of construction and function is identical to the contact pressure element 96.

The contact pressure element or "sensor element" 96 is preferably disposed so as to be pivotable on the delimiting element 74 and is connectable to the latter. No bills 48 are deposited in the dispensing compartment 72 in the illustration as per FIG. 3. The delimiting element 74 is situated in a first delimiting position, and the contact pressure element 96 is situated in a first contact pressure position, wherein the contact pressure element 96 contacts the depositing element 62. When a bill 48 is fed to the dispensing compartment 72, the movement of the bill 48 is decelerated or stopped by the contact pressure element 96. Moreover, the fed bill 48 deflects the contact pressure element 96 in the direction of the delimiting element 74. The fed bill 48, already when being fed into the dispensing compartment 72, by the contact pressure element 96 is pushed against the depositing element 62, thus ensuring an orderly depositing of the bills.

The fed bills 48 form a bill stack, wherein the bills 48 of the bill stack are stacked on top of one another in such a manner that the lowermost, i.e. the first fed, bill 48 by way of the front side thereof or the rear side thereof bears on the depositing element 62. The uppermost bill 48 by way of the front side thereof or the rear side thereof contacts the contact pressure element 96. The direction from the lowermost bill 48 to the uppermost bill 48 is a stacking direction R1 of the bill stack. The more bills 48 deposited on the depositing element 62, the higher the bill stack formed by the bills 48 and the greater the deflection of the contact pressure element 96 in the direction of the delimiting element 74. Visible in the illustration as per FIG. 3 is a sensor unit 98 which is configured to detect a second contact pressure position of the contact pressure element 96 that corresponds to a pre-set deflection of the contact pressure element 96 and thus to a pre-set height of the bill stack.

The sensor unit 98 preferably comprises a light barrier having a transmitter and having a receiver which are disposed opposite one another. The sensor unit 98, which is assigned to the contact pressure element 96, and a further sensor unit 99, which is assigned to the contact pressure element 97, will be explained in more detail in the context of FIG. 6. When the contact pressure element 96 is deflected to the second contact pressure position, an interrupter element of the contact pressure element 96 not visible in FIG. 3 interrupts the light beam emitted by the transmitter of the sensor unit 98, the receiver detecting the interruption. As soon as the interruption of the light beam of the sensor unit 98, or of the light beams of both sensor units 98, 99, is detected by the sensor unit 98, 99, the latter generates a detection signal and transmits the detection signal to the control unit 44. The control unit 44 thereupon actuates a drive unit 94 which by way of a gearbox assembly 95 moves the depositing element 62 by a pre-set distance counter to the stacking direction R1.

As a result of this movement the contact pressure element 96 is moved from the second contact pressure position, away from the delimiting element 74, so that the second contact pressure position of the contact pressure element 96 is no longer detected by the sensor unit 98. Subsequently, further bills 48 can be fed to the dispensing compartment 72, wherein the procedure of the movement of the depositing element 62 counter to the direction R1 described above is repeated when the contact pressure element 96 is moved yet again to the second contact pressure position by the deposited bills 48.

The depositing element 62 comprises a plurality of ribbed elements of which one ribbed element identified by the reference sign 100 is visible in the illustration as per FIG. 3. In the closed position of the closure element 60 illustrated in FIG. 3 the ribbed element 100 engages in a complementary clearance of the closure element 60. As a result, access to the dispensing compartment 72 by any unauthorized third party is impeded. The delimiting element 74 furthermore comprises an engagement element 102 which is movable between a deployed position, illustrated in FIG. 3, and a retracted position.

As soon as all bills 48 destined for disbursement have been fed to the dispensing compartment 72, the control unit 44 carries out the steps for opening the dispensing compartment 72. In a first step, the depositing element 62 with the aid of the drive unit 94 is moved in the direction of the delimiting element 74, wherein the delimiting element 74 is disposed in such a manner that the latter in this movement of the depositing element 62 is moved to a second delimiting position. In a second step, the control unit actuates a further drive unit 104, not visible in the illustration as per FIG. 3, so as to move the closure element 60 from the closed position, illustrated in FIG. 3, to an opened position. During the movement from the closed to the opened position, the closure element 60 comes to engage with the engagement element 102 of the delimiting element 74 disposed in the second delimiting position.

Figure 4:
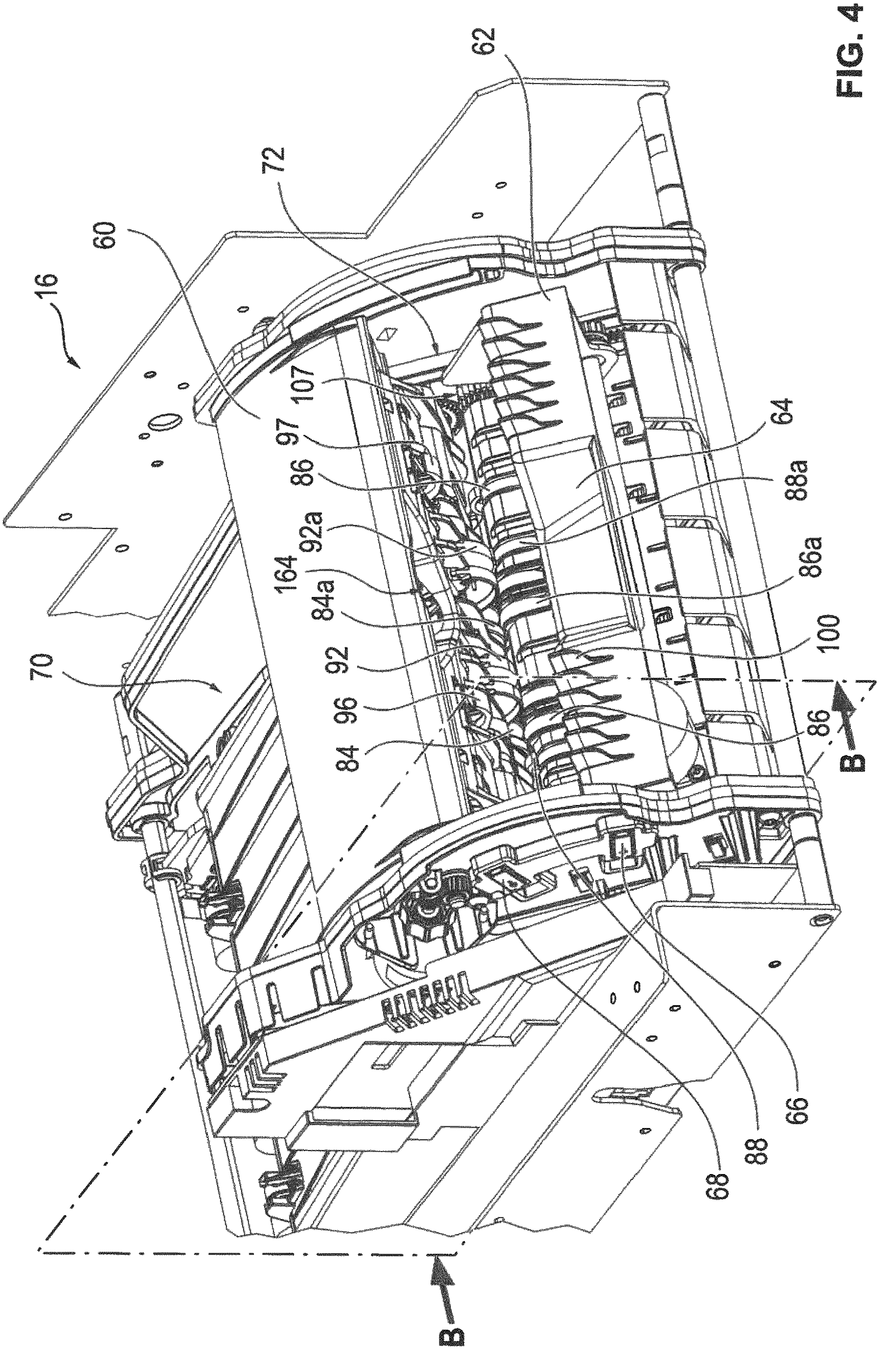
FIG. 4 shows a perspective detailed view of the bill dispensing unit as per FIGS. 2 and 3, having an opened closure element.
Figure 5:
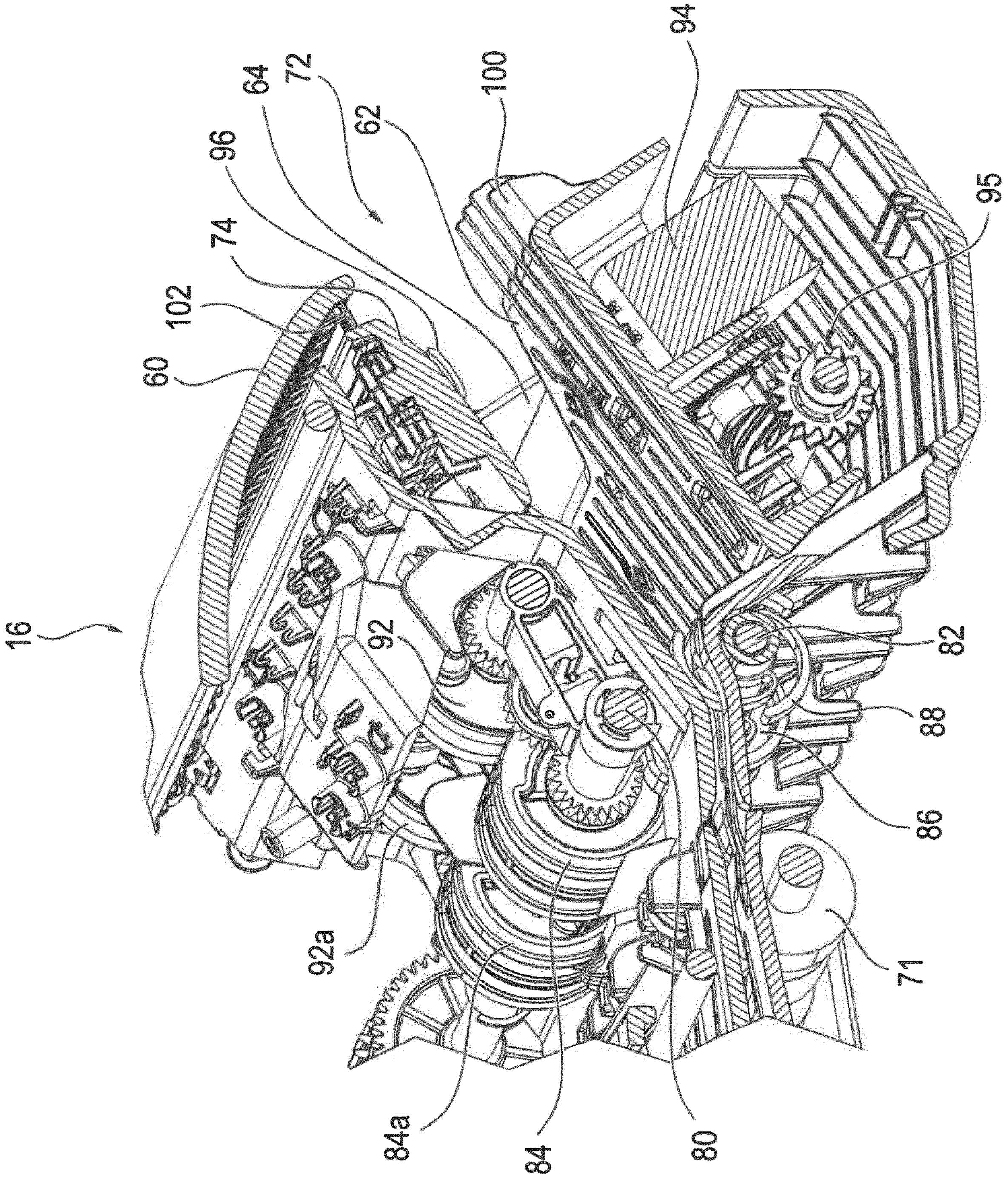
FIG. 5 shows a fragment of a perspective sectional illustration of the bill dispensing unit as per FIG. 4.

Upon engaging with the closure element 60, the engagement element 102 and the delimiting element 74 are moved conjointly with the closure element 60 until the closure element 60 assumes the opened position illustrated in FIGS. 4 and 5. In the course of this conjoint movement of the delimiting element 74 and the closure element 60, the delimiting element 74 is moved from the second delimiting position to a third, opened delimiting position.

During the movement from the closed position to the opened position the closure element 60 is guided in a guide track, a movement of the closure element 60 about a virtual rotation axis D1 being in particular performed herein. In contrast, the delimiting element 74 is rotated about a second rotation axis D2, which is different from the rotation axis D1 and is congruent with the longitudinal axis of the shaft 80. In this way, the pivot radius S1 of the closure element 60 is larger than the pivot radius S2 of the delimiting element 74. As a result of the described disposal of the closure element 60 and of the delimiting element 74 it is achieved that the engagement element 102 is moved from the deployed to the retracted position, while the delimiting element 74 is moved from the second delimiting position to the third delimiting position. The engagement element 102 herein deforms an elastic element, preferably a restoring spring, which is not visible in the illustration as per FIG. 3.

Furthermore, the control unit 44 during the movement of the delimiting element 74 from the second delimiting position to the third delimiting position is configured to actuate the drive unit 94 so as to move the depositing element 62 in the direction counter to the delimiting element 74. It is achieved as a result that the volume of the dispensing compartment 72 in the case of an opened closure element 60 is further enlarged so that ready access to the bill 48 or bill stack situated in the dispensing compartment 72 is possible. The position of the depositing element 62 is monitored with the aid of a sensor unit 140, wherein the control unit 44 is configured to actuate the drive unit 94 as a function of a signal of the sensor unit 140.

FIG. 4 shows a perspective detailed view of the bill dispensing unit 16 as per FIGS. 2 and 3, having an opened closure element 60. In addition to the transport elements illustrated in FIG. 3, the transport rollers 84*a* and 86*a*, the rotary blades 88*a* and 88*b*, as well as the discharge roller 92*a* and the contact pressure element or "sensor element" 97 are also visible in the illustration as per FIG. 4. Furthermore visible is part of the gearbox assembly 107. In the opened position of the closure element 60 shown in FIG. 4, access to the bills 48 deposited in the receptacle compartment 72 is readily possible when the outer closure element 260, illustrated in FIGS. 12 to 16, is also simultaneously opened.

FIG. 5 shows a fragment of a perspective sectional illustration of the bill dispensing unit 16 along the section plane B as per FIG. 4. The engagement between the engagement element 102 and the closure element 60 is particularly visible in the illustration as per FIG. 5, the delimiting element 74 being held in the third delimiting position by said engagement.

Figure 6:
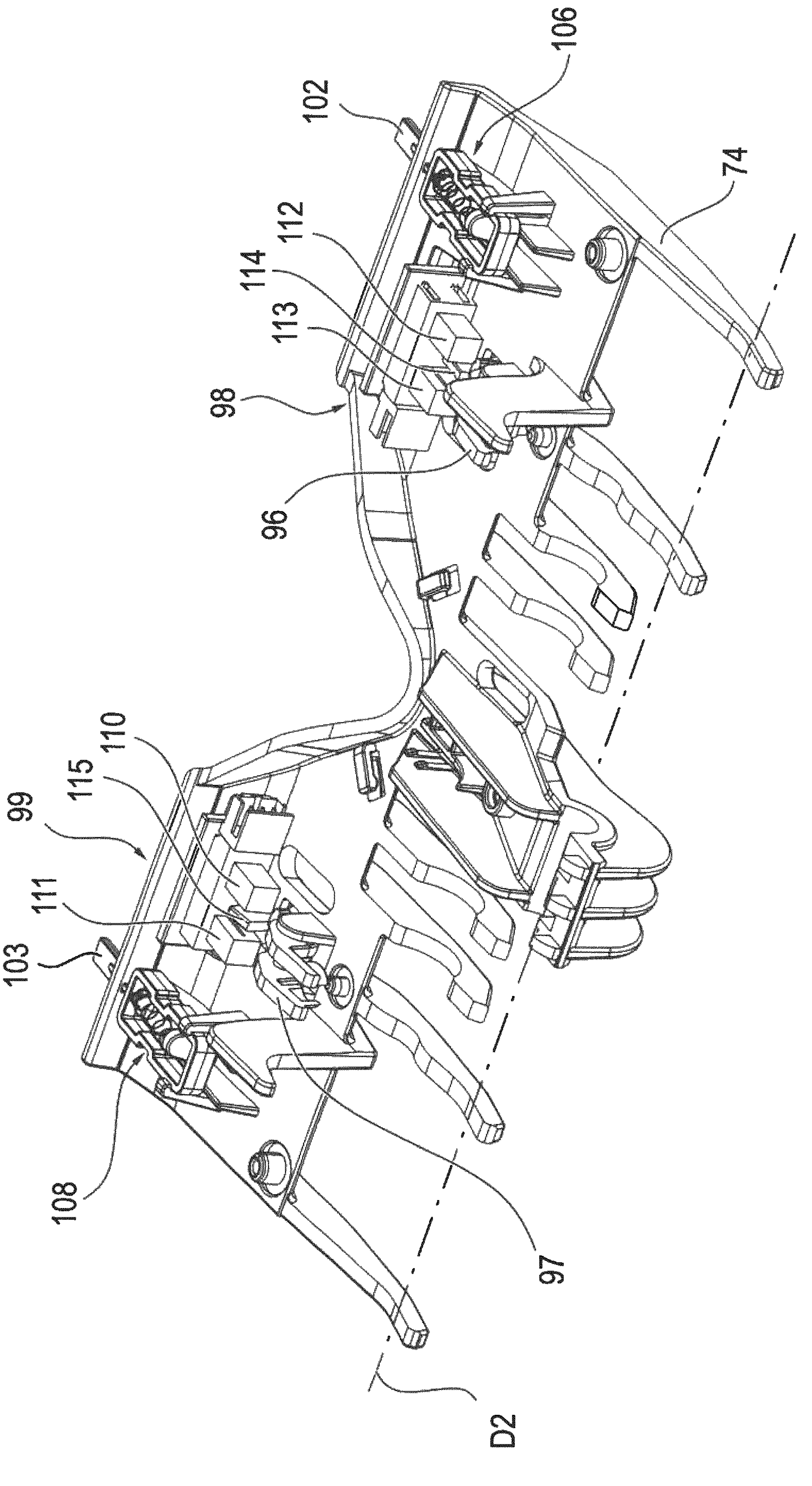
FIG. 6 shows a perspective view of a delimiting element of the bill dispensing unit as per FIGS. 2 to 5.

FIG. 6 shows a perspective view of the delimiting element 74 as per FIGS. 2 to 5. For illustrative purposes, the contact pressure element 96 is illustrated in the first contact pressure position and the contact pressure element 97 is illustrated in the second contact pressure position. However, during a disbursement procedure the contact pressure elements 96, 97 always assume identical contact pressure positions. An interrupter element 109 of the contact pressure element 97 interrupts the light beam emitted by the transmitter 110 of the sensor unit 99, said light beam thus no longer being detected by the receiver 111 so that the second contact pressure position of the contact pressure element 97 is detected by the control unit 44. However, in the first contact pressure position of the contact pressure element 96 the light beam between the transmitter 112 and the receiver 113 is not interrupted by the interrupter element 114. Furthermore visible in the illustration as per FIG. 6 are the springs 106 and 108 which are elastically deformed by the respective engagement elements 102 and 103 when the latter are moved from the deployed to the retracted position.

Figure 7:
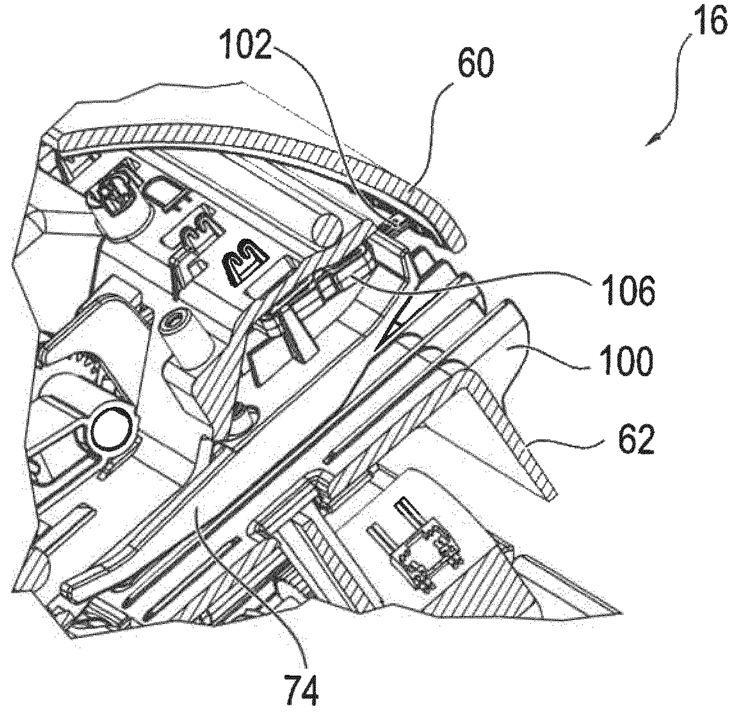
FIG. 7 shows a perspective sectional illustration of several elements of the bill dispensing unit as per FIGS. 2 to 6.

FIG. 7 shows a perspective sectional illustration of several elements of the bill dispensing unit 16 as per FIGS. 2 to 6, in which the delimiting element 74 is situated in the second delimiting position and the closure element 60 is situated between the closed position and the opened position.

Figure 8:
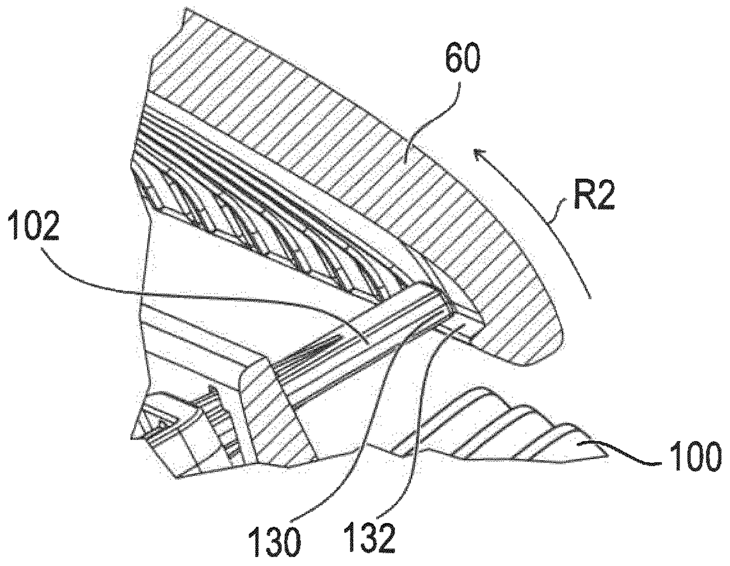
FIG. 8 shows an enlarged detailed view of an engagement element as per FIG. 7.

FIG. 8 shows an enlarged detailed view of part of the delimiting element 74 of the engagement element 102 and part of the closure element 60 as per FIG. 7. In the illustration as per FIG. 8 the delimiting element 74 is disposed in the second delimiting position. A tip 130 of the engagement element 102 that projects from the delimiting element 74 in the direction of the closure element 60 protrudes into the motion path of a protrusion 132 of the closure element 60. In a further movement of the closure element 60 in the direction R2, the protrusion 132 and the tip 130 come to mutually engage in such a manner that the engagement element 102 is entrained by the closure element 60 so that the delimiting element 74, conjointly with the engagement element 102, is pivoted about the rotation axis D2 of said engagement element 102.

Figure 9:
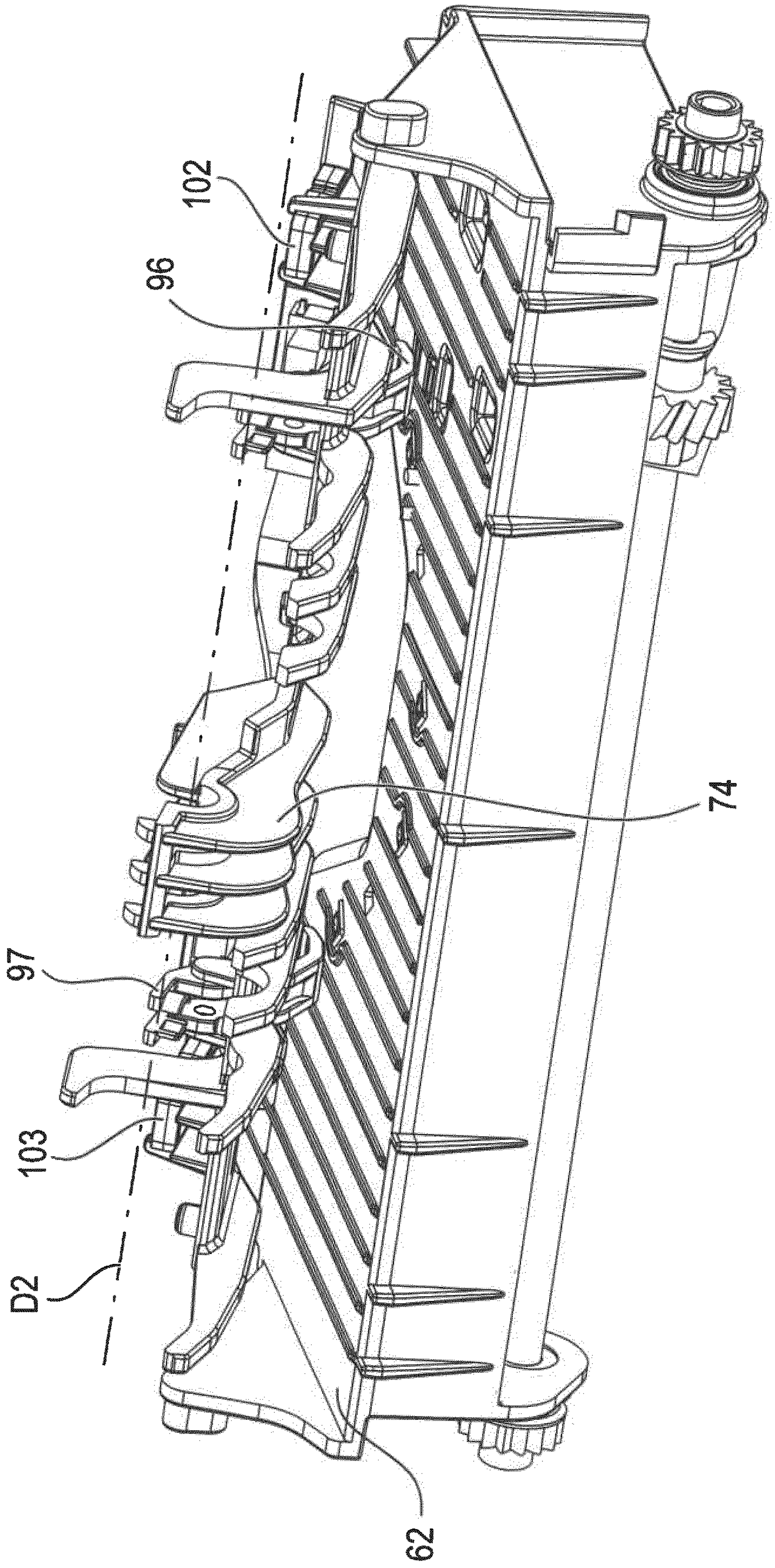
FIG. 9 shows a perspective detailed view of a depositing element and of the delimiting element of the bill dispensing unit as per FIGS. 2 to 8.
Figure 10:
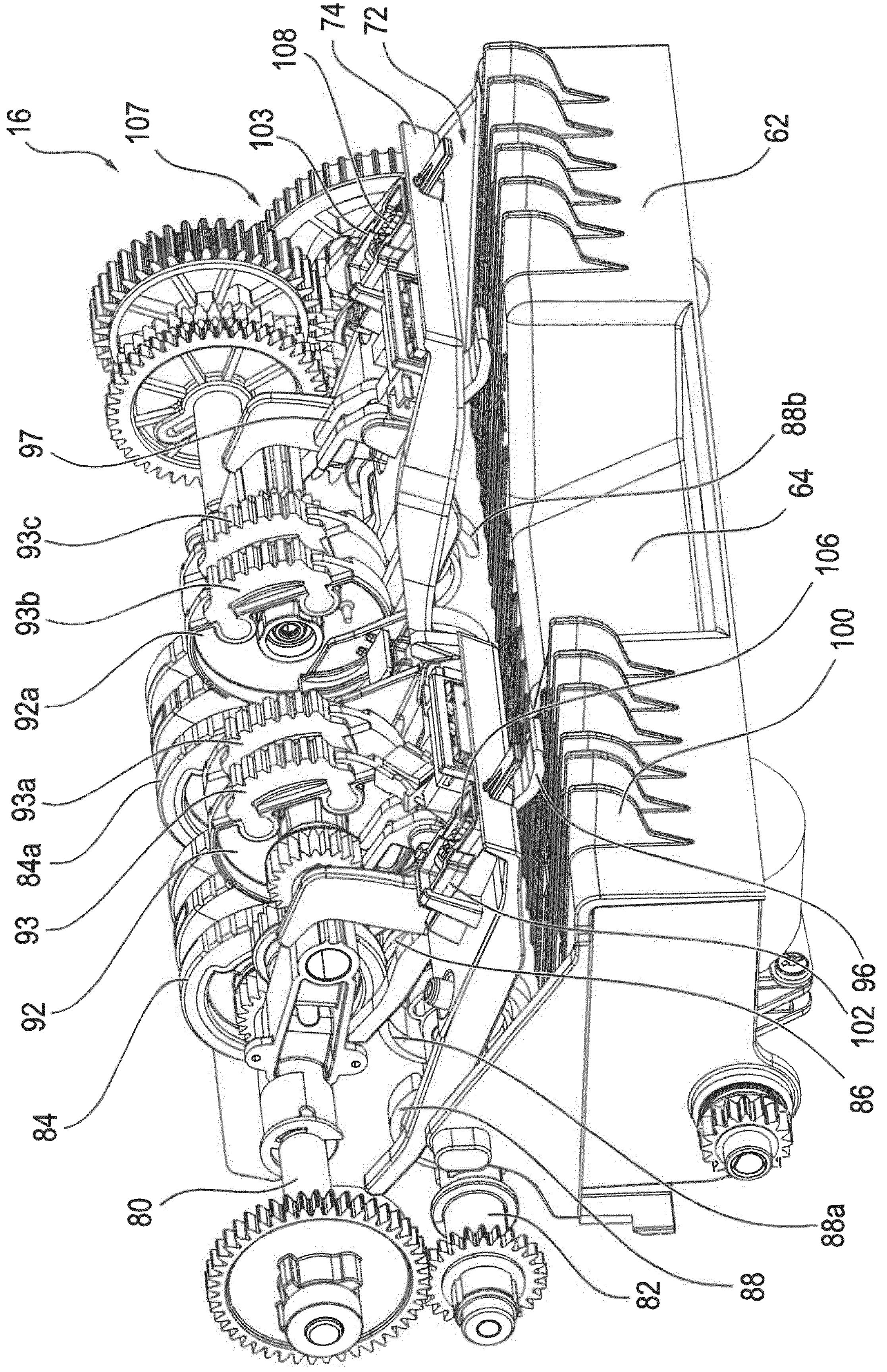
FIG. 10 shows a further perspective detailed view of the bill dispensing unit as per FIGS. 2 to 9.

FIG. 9 shows a perspective detailed view of the depositing element 62 and of the delimiting element 74. FIG. 10 shows a further perspective detailed view of the bill dispensing unit 16. Discharge means 93, 93*a*, 93*b*, 93*c* which are disposed on the discharge rollers 92, 92*a* and which are preferably made from an elastomer and ensure the singularizing of the bills 48 that are not retrieved from the dispensing compartment 72 and classified as retracts are particularly visible in the illustration as per FIG. 10.

Figure 11:
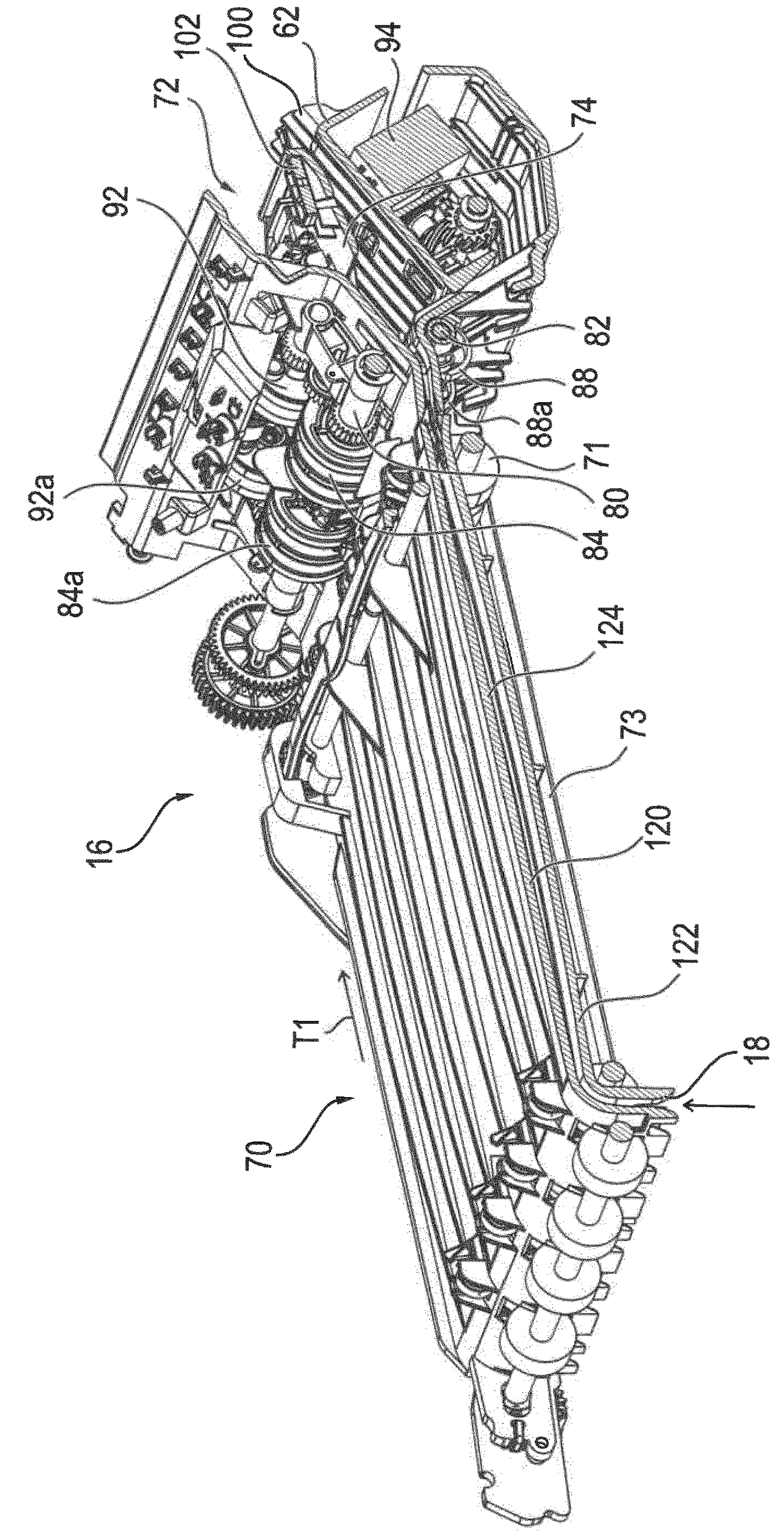
FIG. 11 shows a further perspective detailed view of the bill dispensing unit as per FIGS. 2 to 10.

FIG. 11 shows a further perspective detailed view of the bill dispensing unit 16 as per FIGS. 2 to 10, having the transport unit 70 for feeding the bills 48 into the dispensing compartment 72 and for transporting the bills 48 not retrieved in the direction of the reject and retract container 54. During the dispensing procedure the bills 48 from the strongbox 14 are fed to the transport unit 70 by way of the transfer opening 18 and transported in the direction T1 to the dispensing compartment 72. Bills 48 that are not retrieved are transported from the dispensing compartment 72 in the direction T2, counter to the direction T1. The transport path 120 of the bills 48 on a first side is delimited by the transport belt 73 and a base element 122, and on the opposite side is delimited by a cover element 124.

Figure 12:
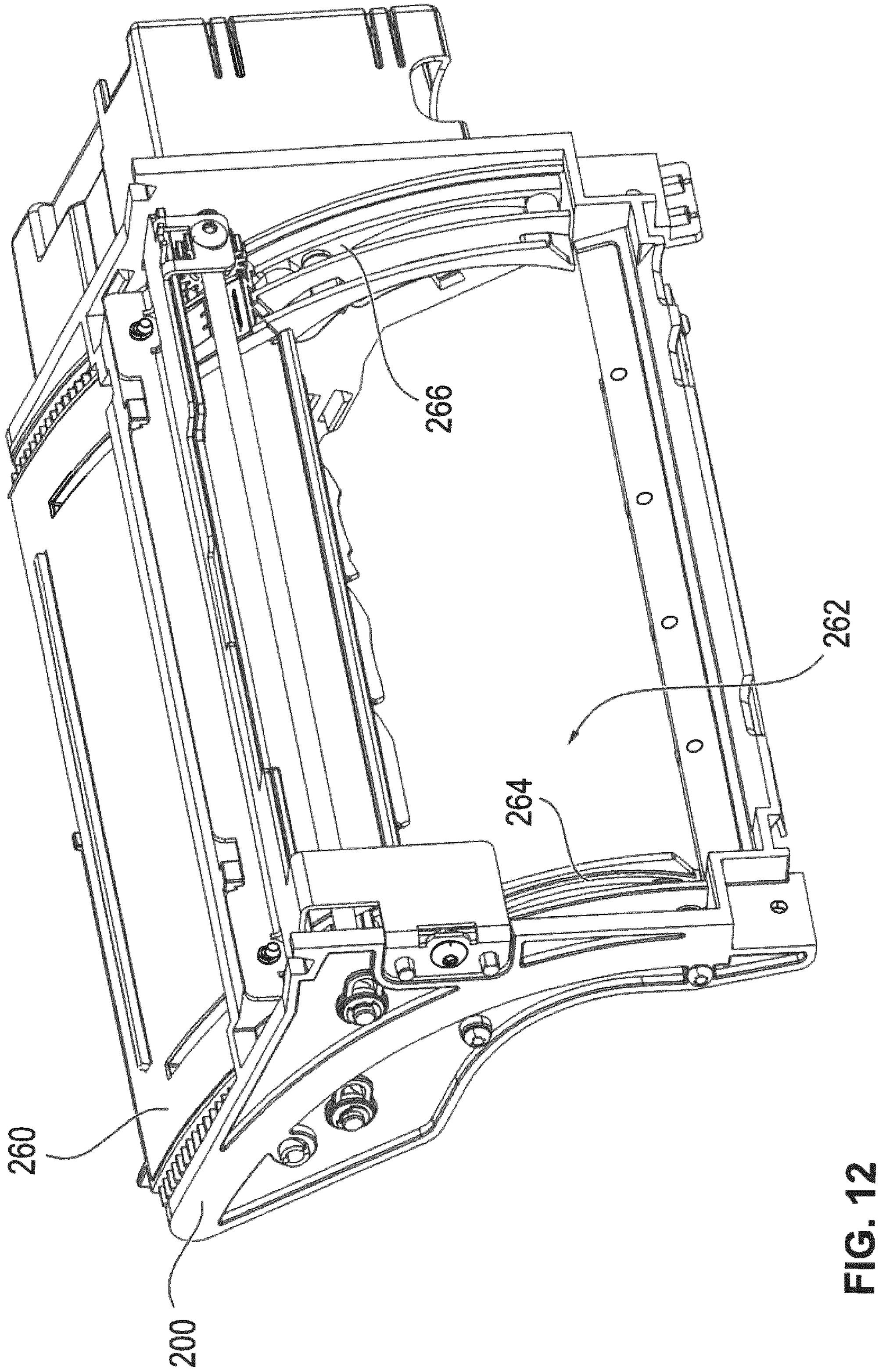
FIG. 12 shows a perspective view of a closure unit which is connectable to the bill dispensing unit as per FIGS. 2 to 11.

FIG. 12 shows a perspective view of a closure unit 200 which comprises an opening 262 that is able to be closed by the outer closure element 260. The bill dispensing unit 16 is disposed behind the opening 262 and, with the aid of fastening means not illustrated, is fixedly connected to the closure unit 200 such that the closure unit 200 and the bill dispensing unit 16 conjointly form part of the head module 12 of the device 10. This connected state will be described in more detail hereunder in the context of FIGS. 13 to 15. The outer closure element 260 with the aid of a drive unit is movable from the opened position illustrated to a closed position, and in the closed position forms a region of the surface of the closure unit 200.

The movement of the outer closure element 260 from the closed position to the opened position, and from the opened position to the closed position, takes place with the aid of a drive unit which is not illustrated for moving the outer closure element and is correspondingly actuated by the control unit 44. The outer closure element 260 during the movement from the closed position to the opened position, and during the movement from the opened position to the closed position is guided in two lateral guide tracks 264, 266.

In one particularly preferred embodiment the device 10 comprises a sensor unit, not illustrated, for detecting the opened position of the outer closure element 260, and a sensor unit, not illustrated, for detecting the closed position of the outer closure element 260. The sensor units are preferably disposed in or behind the closure unit 200. Said sensor units, when detecting the respective position of the closure element 260, generate a sensor signal and transmit in each case this sensor signal to the control unit 44 which is configured to actuate the drive unit for moving the outer closure element 260 as a function of the transmitted sensor signal.

Figure 13:
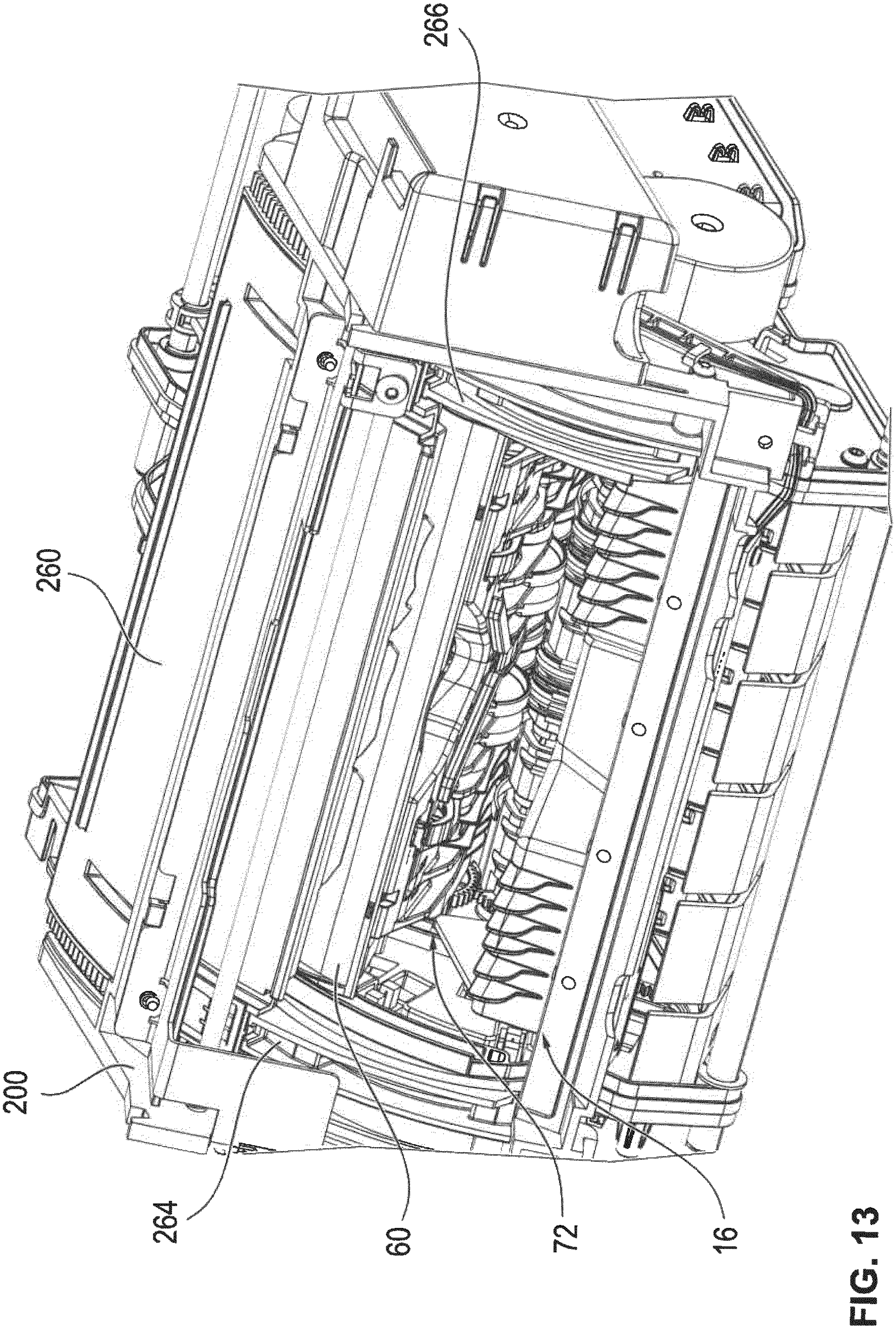
FIG. 13 shows a perspective view of a closure unit which as per FIG. 12 and of the bill dispensing unit as per FIGS. 2 to 11, in a connected state.

FIG. 13 shows a perspective view of the closure unit 200 and of the bill dispensing unit 16, in the connected state.

The outer closure element 260 and the inner closure element 60 both are situated in the opened position so that access to bills 48 provided in the dispensing compartment 72, not illustrated in FIG. 13, is possible. The outer second closure element 260 and the inner first closure element 60 are not mechanically coupled so that opening and closing of the outer closure element 260 does not have a mechanical effect on the opening or closing of the inner closure element 60.

Furthermore, the control unit 44 is configured to actuate the drive unit for moving the inner closure element 60 and the drive unit for moving the outer closure element 260 in a mutually independent manner. The advantage of this separate actuation will be explained by means of the example hereunder.

When the control unit 44 actuates the drive unit for moving the outer closure element 260 from the opened to the closed position, the sensor unit for detecting the closed position of the outer closure element 260 detects the outer closure element 260, normally after a predetermined temporal interval. Exceeding this temporal interval indicates that the outer closure element 260 has been manipulated. In order to prevent access to the dispensing compartment 72 by any unauthorized third party, the control unit 44, after the predetermined period has elapsed, actuates the drive unit for moving the inner closure element 60 in such a manner that said drive unit moves the inner closure element 60 to the closed position, or that the inner closure element 60 remains in the closed position.

At least one of the closure elements 60, 260 comprises a metal layer, in particular a stainless steel layer, or a metal element which has in particular been produced by a die casting method, or a metal sheet, in particular a metal element produced by means of aluminum die casting, zinc die casting or magnesium die casting, wherein cast alloys with a low melting point, in particular aluminum alloys, zinc alloys or magnesium alloys are preferably used. In this way, the closure elements 60, 260 have a high flexural strength and can furthermore resist high temperatures.

Figure 14:
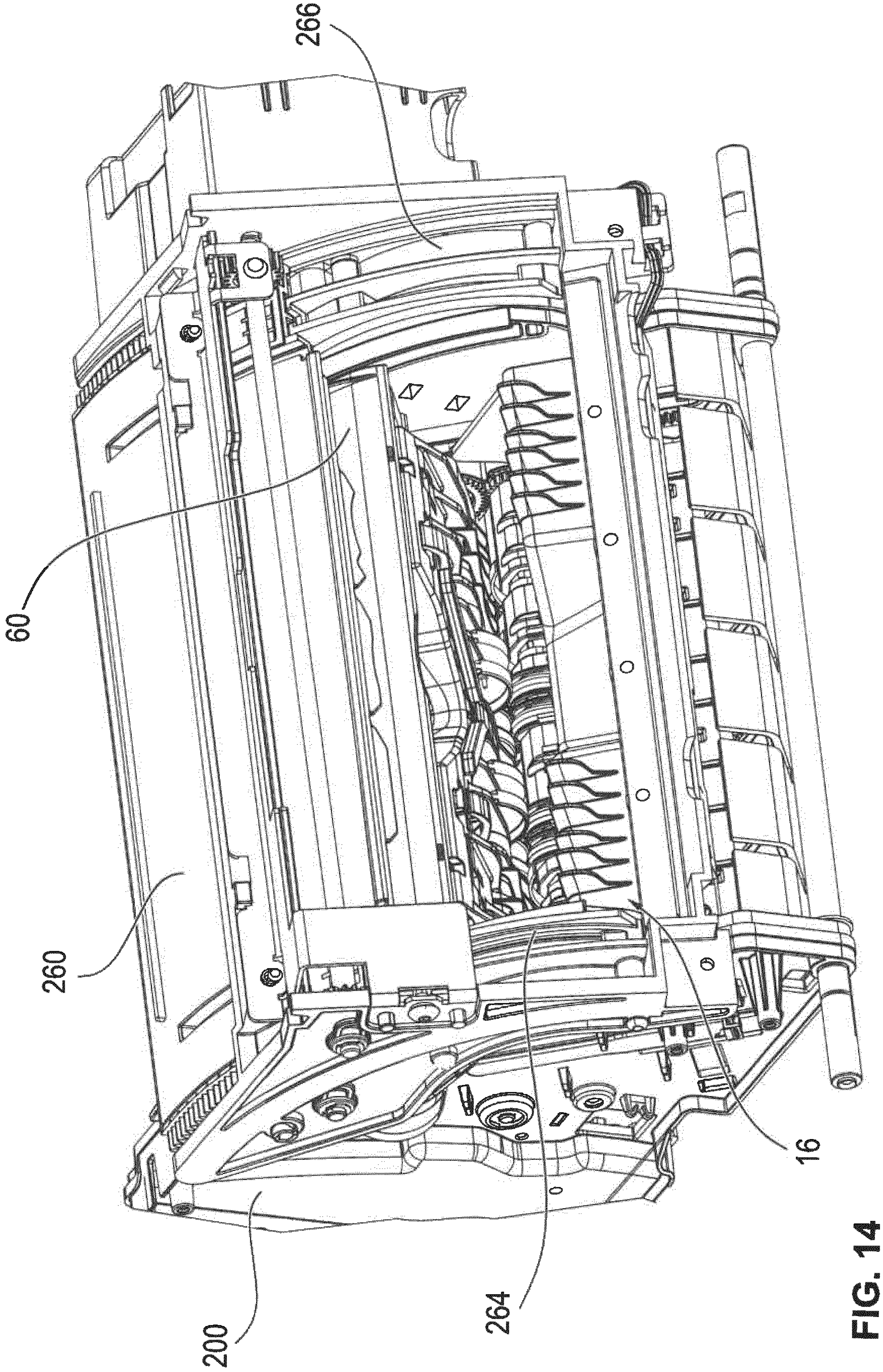
FIG. 14 shows a further perspective view of the closure unit and of the bill dispensing unit as per FIG. 13.
Figure 15:
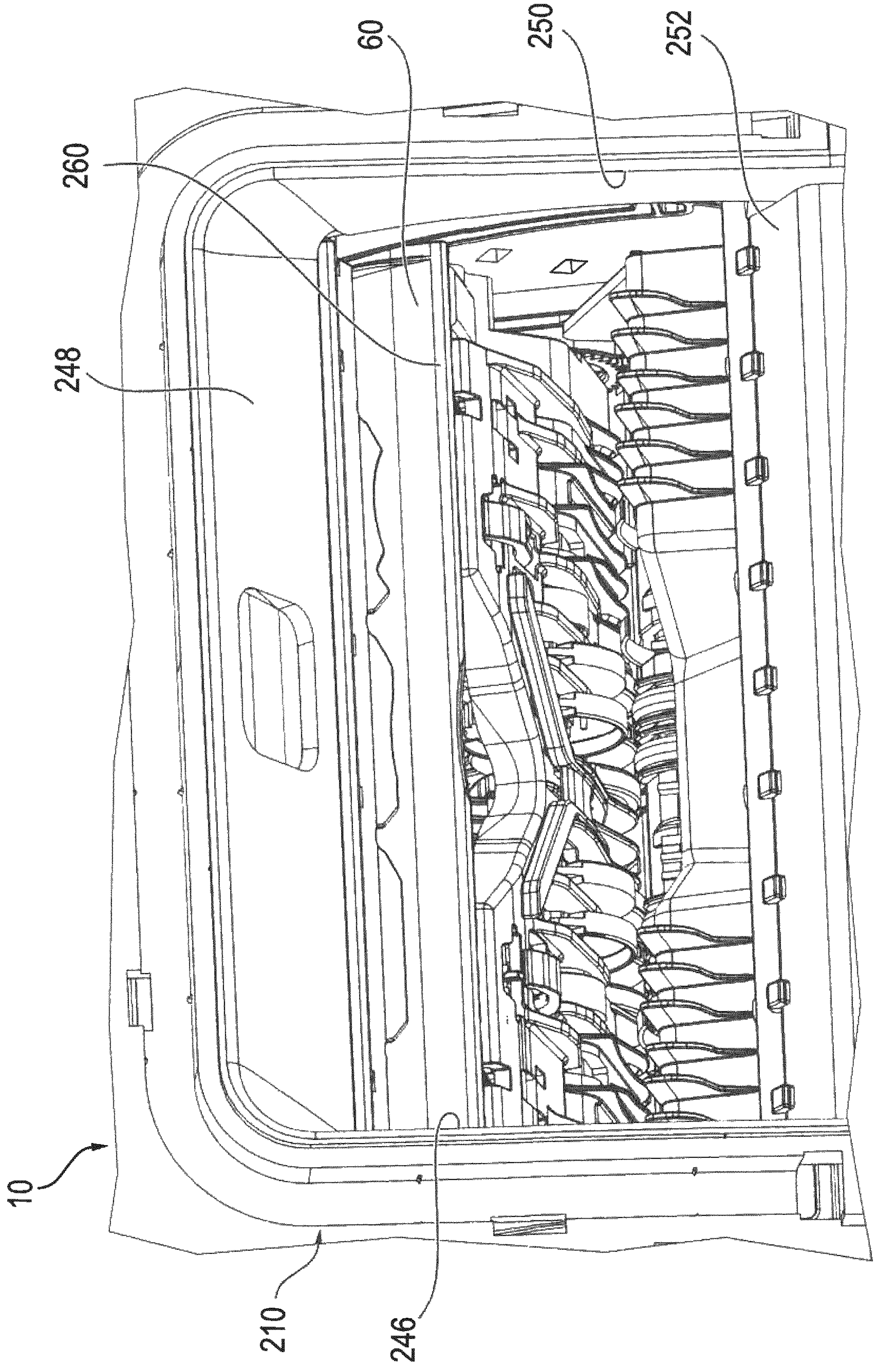
FIG. 15 shows a perspective view of a dispensing region of the device as per FIGS. 1 to 14.

FIG. 14 shows a further perspective view of the closure unit 200 and of the bill dispensing unit 16. FIG. 15 shows a perspective view of a dispensing region 210 of the device 10. The dispensing region 210 is delimited by four delimiting walls 246, 248, 250, 252 and, in the closed state of the outer closure element 260, by the outer closure element 260. The spacing between the delimiting walls 216 and 220 has in particular a value in the range from 18 cm to 25 cm. The spacing between the delimiting walls 222 and 218 has in particular a value in the range from 8 cm to 25 cm.

When the outer closure element 260, in particular by virtue of external manipulation, is situated in the opened position, and the inner closure element 60 is situated in the closed position, the dispensing region 210 is delimited by the four delimiting walls 216, 218, 220, 222 and by the inner closure element 60.

In one preferred embodiment the control unit 44 determines a manipulated state of the device 10 when the duration during which the sensor unit for detecting the closed position of the outer closure element 260 does not detect the closed position exceeds a pre-set limit value. In one particularly preferred embodiment the control unit 44, from the point in time at which the manipulated state is determined, actuates the device 10 in an error mode. In the error mode the device 10 cannot be actuated to dispense bills 48 by the operator. In one further preferred embodiment the device 10, from the point in time at which the manipulated state is determined, is automatically switched off and an error message is emitted to a central control unit of a bank or of a service provider.

In the embodiment illustrated in FIGS. 13 to 15 the outer closure element 260 and the inner closure element 60 both are pivotable about the rotation axis D1. In an alternative embodiment the closure element 60 is pivotable about the rotation axis D1 while the outer closure element 260 is pivotable about a rotation axis which is different from the rotation axis D1. Alternatively, the outer closure element 260 and/or the inner closure element 60 for opening and closing can be displaced on a path which is not in the shape of a circular segment.

In a further alternative embodiment, one or both closure elements 60, 260 are produced from a plastics material, in particular from an electrically conducting plastics material.

Figure 16:
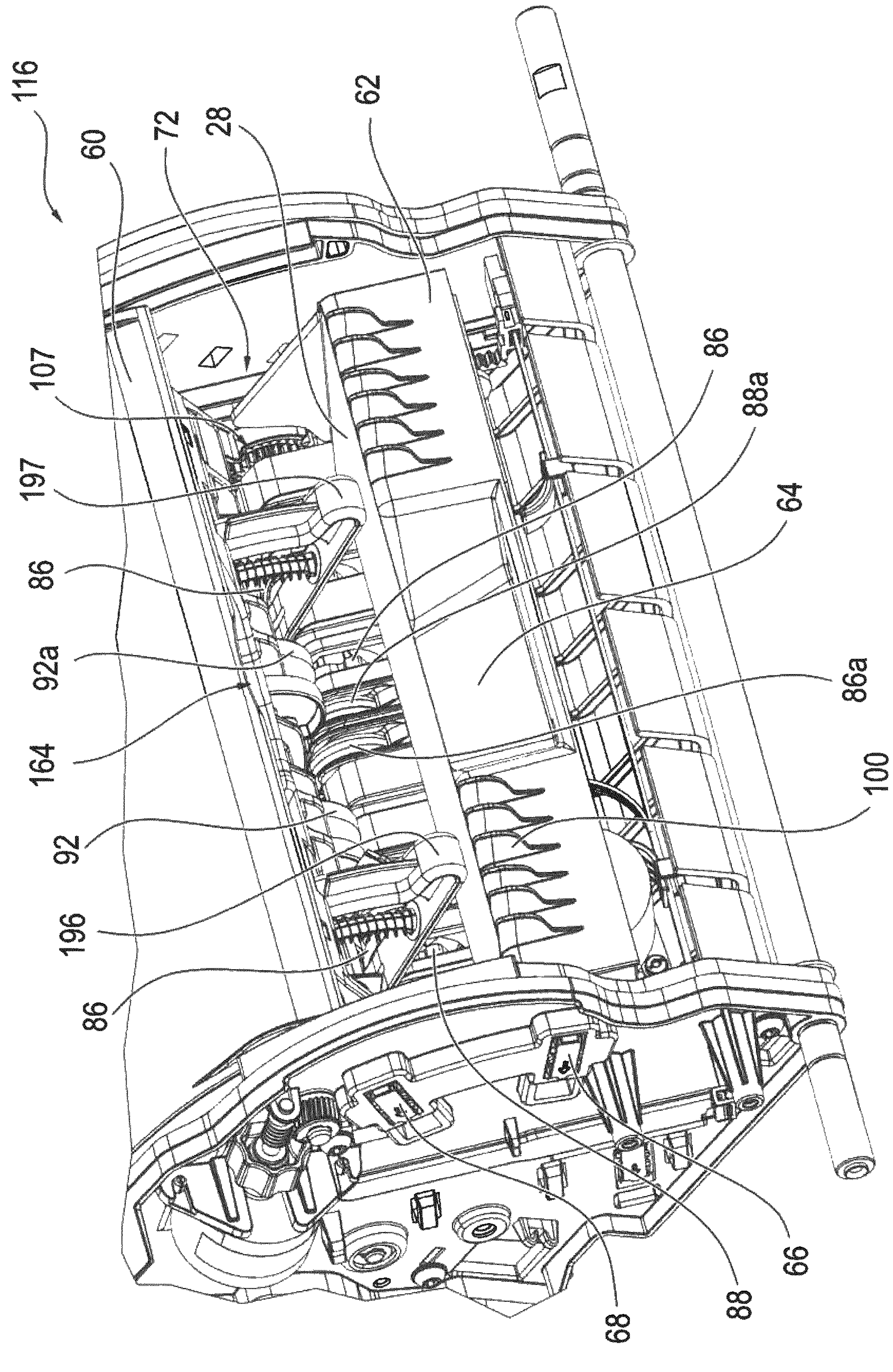
FIG. 16 shows a perspective view of a bill dispensing unit according to a second embodiment which, as an alternative to the bill dispensing unit as per

FIG. 16 shows a perspective view of a bill dispensing unit 116 according to a second embodiment which, as an alternative to the bill dispensing unit 16 as per FIGS. 2 to 15, is suitable for use in the device 10 as per FIG. 1. Elements of identical construction or identical function have the same reference signs.

The illustration as per FIG. 16 is a perspective detailed view of the bill dispensing unit 116 having an opened closure element 60. The bill dispensing unit 116 in terms of construction and function is identical to the bill dispensing unit 16, but the contact pressure elements 96, 97 have been replaced by the contact pressure elements 196 and 197. Other aspects of the construction and other functions are identical.

As opposed to the contact pressure elements 96, 97, the contact pressure elements 196, 197 are not connected to the delimiting element 74 but are disposed so as to be pivotable about a fixed rotation axis (D3 in FIG. 21) so that the contact pressure elements 196, 197 are movable independently of the delimiting element 96. In FIG. 16 a bill 28 is disposed in the dispensing compartment 72, said bill 28 being held on the depositing element 62, or being pushed against the depositing element 62, respectively, by the contact pressure elements 196, 197. In the position of the depositing element 62 shown in FIG. 13, the contact pressure elements 196, 197 are pushed against the depositing element 62 with the aid of springs 220, 221. The contact pressure element 196 for guiding the movement has a guide bar 216 which protrudes into a guide opening 218 and in a movement of the contact pressure element 196 is guided counter to the spring force and in the direction of the spring force. The spring 220 is configured as a spiral spring and is disposed about the guide bar 216. One end of the spring 220 pushes against the contact pressure element 196. The other end of the spring pushes against a fixed housing part of the dispensing compartment 62. In the same way, the spring 221 on the contact pressure element 197 is disposed about a guide bar 217, wherein the guide bar 217 protrudes into a guide opening 219 and in a movement of the contact pressure element 197 is guided in the guide opening 219.

Figure 17:
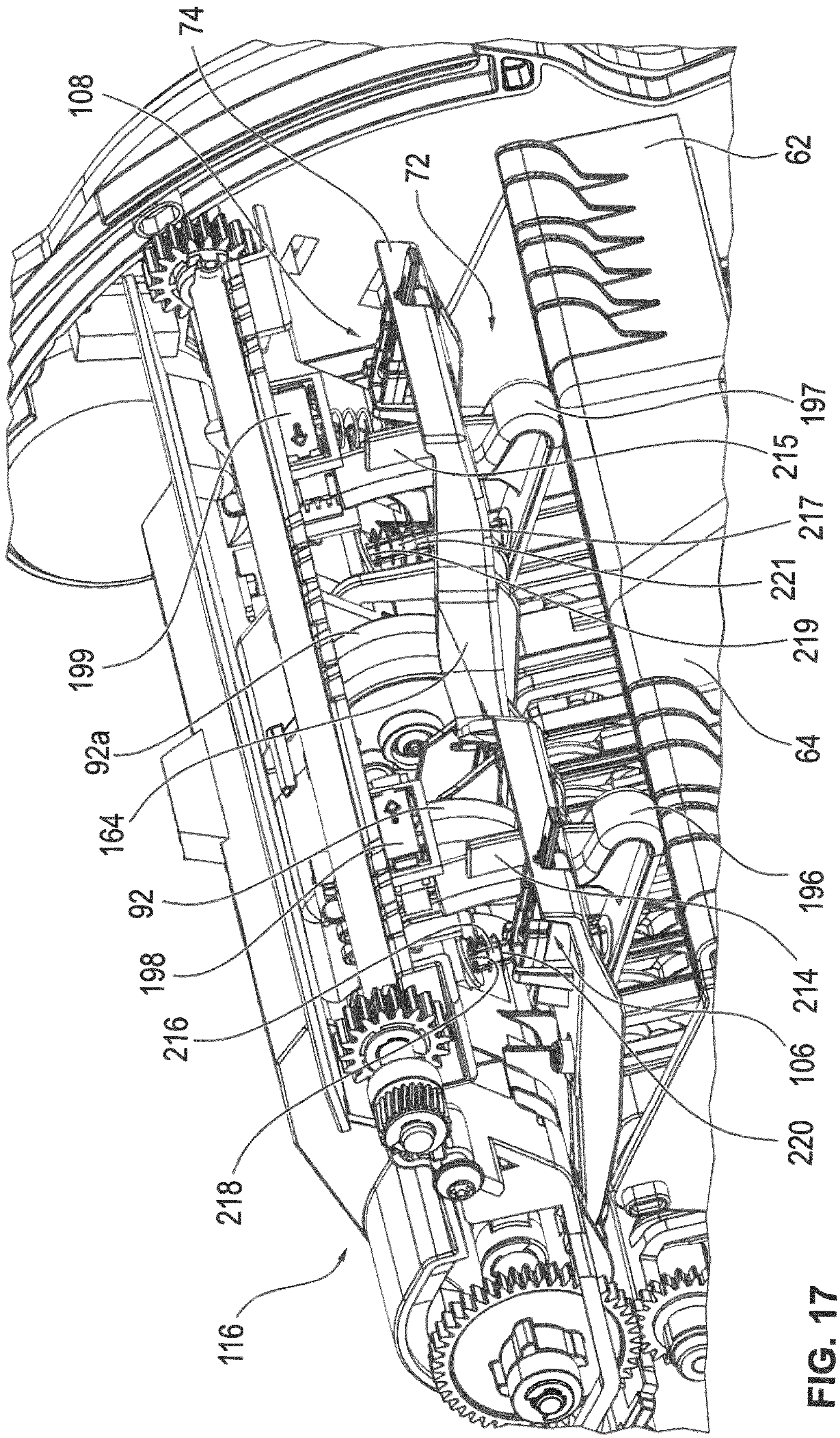
FIG. 17 shows a perspective detailed view of a fragment of the bill dispensing unit as per FIG. 16.

FIG. 17 shows a perspective detailed view of a fragment of the bill dispensing unit 116 as per FIG. 16. A plurality of elements have been omitted for the purpose of simplified illustration and improved clarity. As opposed to the illustration as per FIG. 16, the delimiting element 74 is disposed in a lower position. Furthermore, no bill is disposed in the dispensing compartment 72. Despite the change of the position of the delimiting element 74, the contact pressure elements 196, 197 are unchanged in comparison to FIG. 16. The contact pressure elements 196, 197 are raised when a plurality of bills are stacked on the depositing element 62. The contact pressure elements 196, 197 each have an interrupter element 214, 215. Once a predetermined stack height of the bills 28 stacked on the depositing element has been reached the interrupter elements 214, 215 drop into the detection range of a sensor unit 198, 199 configured as a light barrier assembly, interrupting the light beam between the transmitter and the receiver (both not illustrated). As a result, the control unit 44 by way of a sensor signal of the sensor units 198, 199 is informed that a predetermined stack height of the bills situated in the dispensing compartment 72 has been reached. This signal can also be utilized for setting the height of the depositing element 62 when initializing the bill dispensing unit 116, as has been described for the bill dispensing unit 16 in the context of the contact pressure elements 96, 97 and the sensor units 98, 99.

FIG. 17 shows a perspective detailed view of a fragment of the bill dispensing unit 116 as per FIG. 16. A plurality of elements have been omitted for the purpose of simplified illustration and improved clarity. As opposed to the illustration as per FIG. 16, the delimiting element 76 is disposed in a lower position. Furthermore, no bill is disposed in the dispensing compartment 72. Despite the change of the position of the delimiting element 76, the contact pressure elements 196, 197 are unchanged in comparison to FIG. 16. The contact pressure elements 196, 197 are raised when a plurality of bills are stacked on the depositing element 62. The contact pressure elements 196, 197 each have an interrupter element 214, 215. Once a predetermined stack height of the bills 28 stacked on the depositing element has been reached the interrupter elements 214, 215 drop into the detection range of a sensor unit 198, 199 configured as a light barrier assembly, interrupting the light beam between the transmitter and the receiver (both not illustrated). As a result, the control unit 44 by way of a sensor signal of the sensor units 198, 199 is informed that a predetermined stack height of the bills situated in the dispensing compartment 72 has been reached. This signal can also be utilized for setting the height of the depositing element 62 when initializing the bill dispensing unit 116, as has been described for the bill dispensing unit 16 in the context of the contact pressure elements 96, 97 and the sensor units 98, 99.

In the same way as described for the contact pressure elements 96 and 97 of the bill dispensing unit 16, the contact pressure elements 196, 197 are situated in a first contact pressure position, and the delimiting element 74 is situated in a first delimiting position, before bills are deposited in the dispensing compartment 72 by the bill dispensing unit 116. The contact pressure element 196, 197 herein contacts the depositing element 62. When a bill 28, 48 is fed to the dispensing compartment 72, the movement of the bill is decelerated or stopped by the contact pressure elements 196, 197. Moreover, the fed bill 48 deflects the contact pressure element 96 in the direction of the sensor unit 198, 199. The fed bill 48, already when being fed into the dispensing unit 72, by the contact pressure elements 196, 197 is pushed against the depositing element 62, thus ensuring an orderly depositing of the bills 28, 48.

The fed bills 28, 48 form a bill stack, wherein the uppermost bill of the bill stack by way of the front side or rear side of thereof contacts the contact pressure elements 196, 197. The more bills deposited in the dispensing compartment 72, the greater the deflection of the contact pressure element 196, 197 in the direction of the sensor unit 198, 199. A second contact pressure position of the contact pressure elements 196, 197 is detected with the aid of the sensor units 198, 199, said second contact pressure position corresponding to a pre-set deflection of the contact pressure elements 196, 197 and thus to a pre-set height of the bill stack. To this end, the respective interrupter element 214, 215 interrupts the light beams emitted by the transmitter of the sensor units 198, 199, wherein the respective receiver detects the interruption, as a result of which a detection signal is transmitted to the control unit 44.

Proceeding therefrom, the control unit 44 actuates the drive unit 94 which by way of a gearbox assembly 95 moves the depositing element 62 by a pre-set distance counter to the stacking direction R1. As a result of this movement, the contact pressure elements 196, 197 are moved from the second contact pressure position, away from the sensor units 198, 199, so that the second contact pressure position of the contact pressure elements 196, 197 is no longer detected by the sensor units 198, 199. Subsequently, further bills can be fed to the dispensing compartment 72, wherein the procedure of the movement of the depositing element 62 counter to the direction R1 described above is repeated when the contact pressure elements 196, 197 are moved yet again to the second contact pressure position by the deposited bills.

Figure 18:
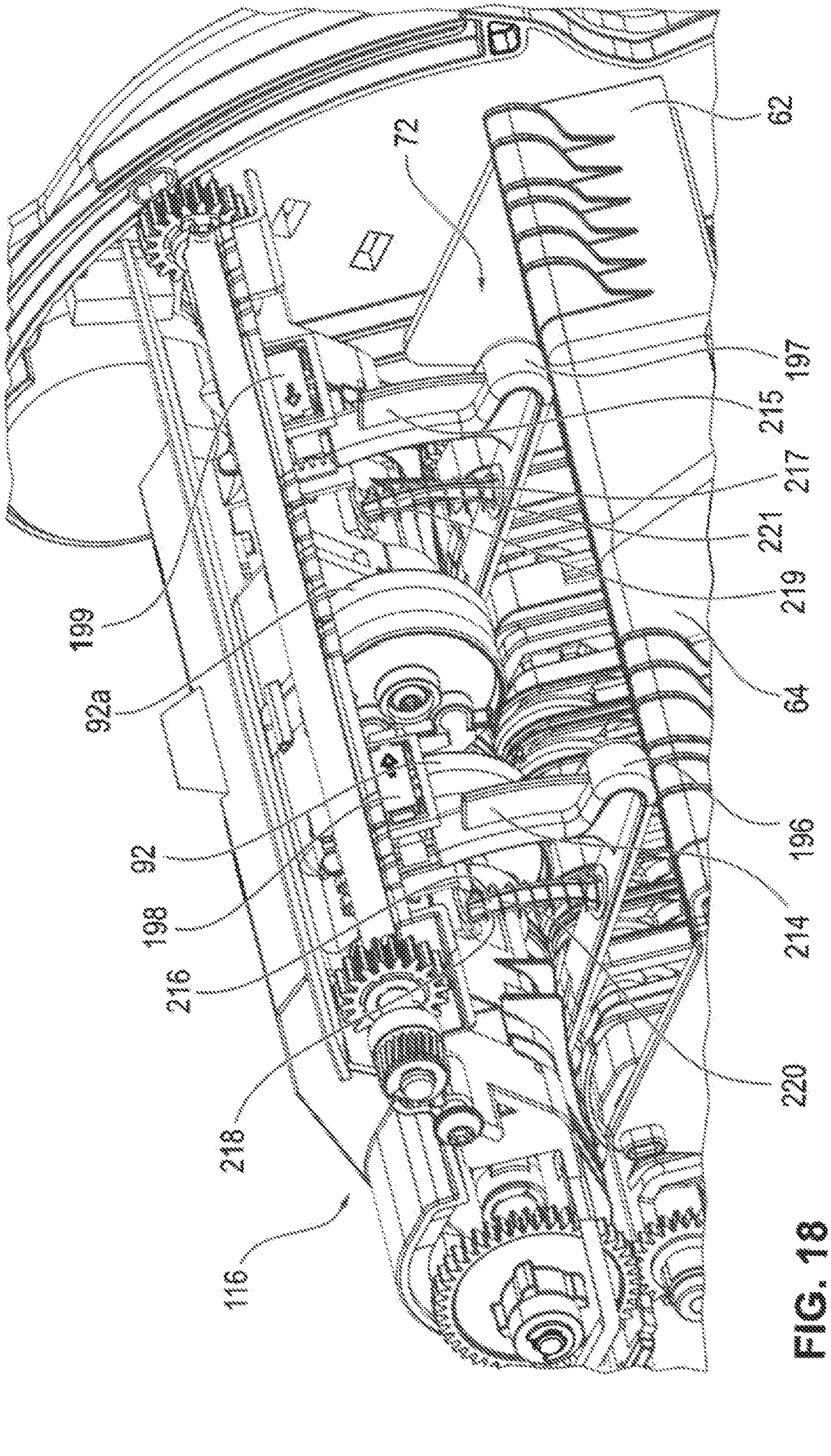
FIG. 18 shows the fragment of the bill dispensing unit as per FIG. 17, wherein a delimiting element of the bill dispensing unit has been omitted.

FIG. 18 shows the fragment of the bill dispensing unit 116 as per FIG. 17, wherein the delimiting element 74 of the bill dispensing unit 116 has been omitted.

Figure 19:
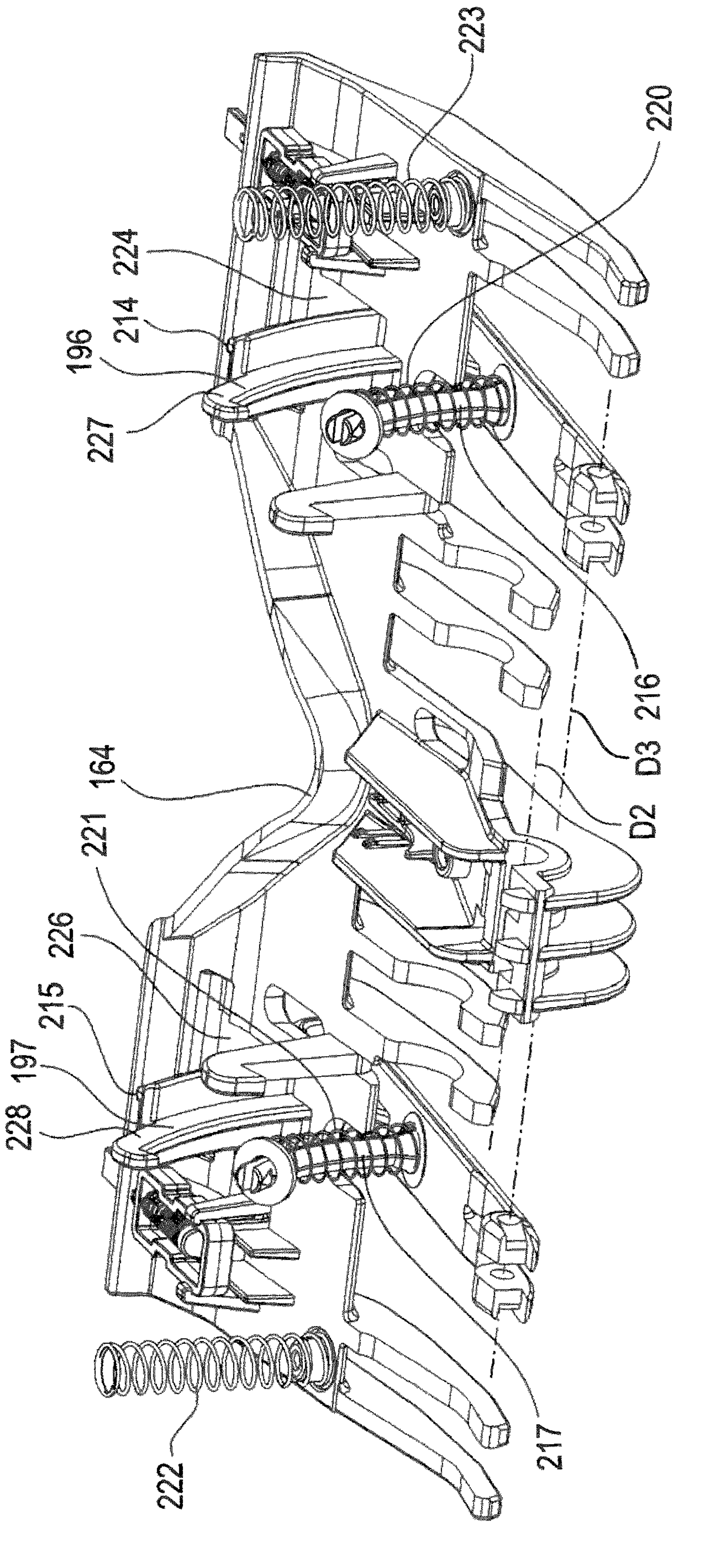
FIG. 19 shows a perspective detailed view of the depositing element and of contact pressure elements of the bill dispensing unit as per FIGS. 16 to 18.

FIG. 19 shows a perspective detailed view of the depositing element 74 and of contact pressure elements 196, 197 of the bill dispensing unit 116 as per FIGS. 16 to 18. In the present exemplary embodiment the contact pressure elements 196, 197 are disposed so as to be pivotable about a pivot axis D3 illustrated in FIG. 20, and the contact pressure element 74 so as to be pivotable about a pivot axis D2 shown in FIG. 6. In the present exemplary embodiment the pivot axes D2 and D3 are mutually parallel and spaced apart. In other exemplary embodiments, the rotation axes D2 and D3 may also lie on a straight line so that the contact pressure elements 196, 197 and the delimiting element 74 are pivoted about the same rotation axis. Provided in the bill dispensing unit 116 are further spring elements 222, 223 which exert on the delimiting element 74 a force in the direction of the depositing element 62 so that the delimiting element 74 is securely held in the lower position when bills are deposited in the dispensing compartment 72 or the closure element 60 is closed. As can be seen in FIG. 19, the interrupter elements 214, 215 are guided by openings 224, 226 in the delimiting element 74. The interrupter elements 214, 215 in terms of the movement thereof relative to the delimiting element 74 are in each case guided by guide elements 227, 228 of the contact pressure elements 196, 197, wherein a protrusion that serves as a detent is configured on that end of the guide elements 227, 228 that is opposite the contact region with the bill 28, 48 of the respective contact pressure element 196, 197. The pivoting movement of the contact pressure elements 196, 197 in relation to the delimiting element 73 is delimited by the protrusion when the protrusion contacts the delimiting element 74.

Figure 20:
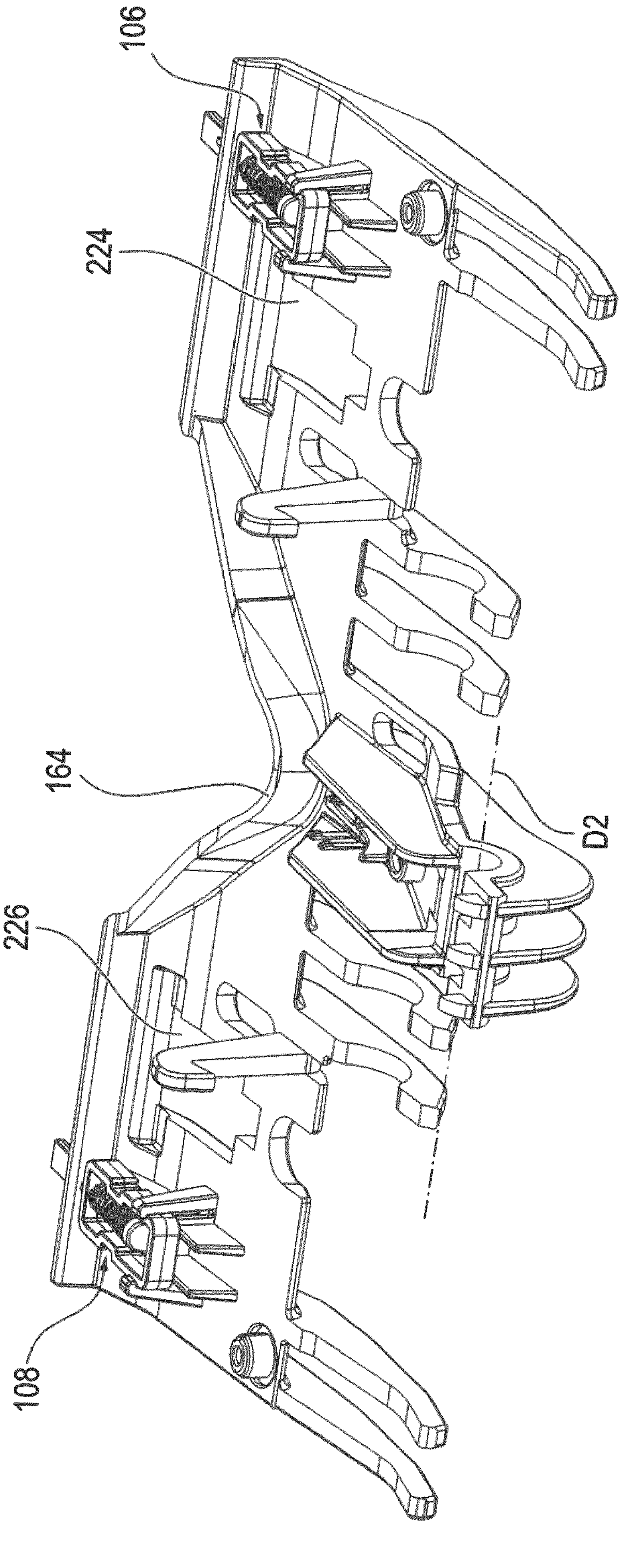
FIG. 20 shows a further perspective detailed view of the dispensing element as per FIG. 19, without contact pressure elements.

FIG. 20 shows a further perspective detailed view of the delimiting element 74 as per FIG. 19, without contact pressure elements 196, 197.

Figure 21:
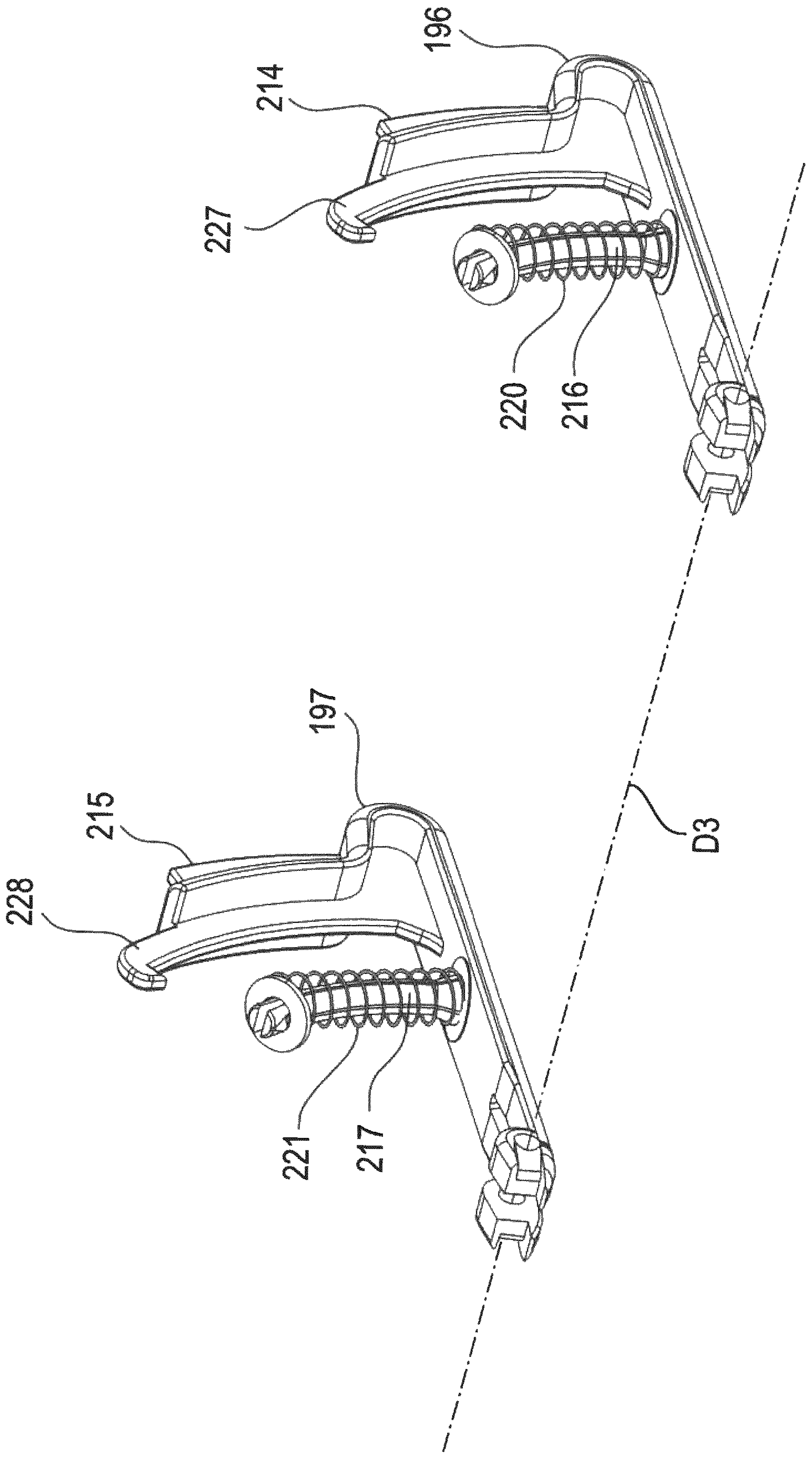
FIG. 21 shows a further perspective detailed view of the contact pressure elements as per FIG. 19.

FIG. 21 shows a perspective detailed view of the contact pressure elements 196, 197 as per FIG. 19.

Figure 22:
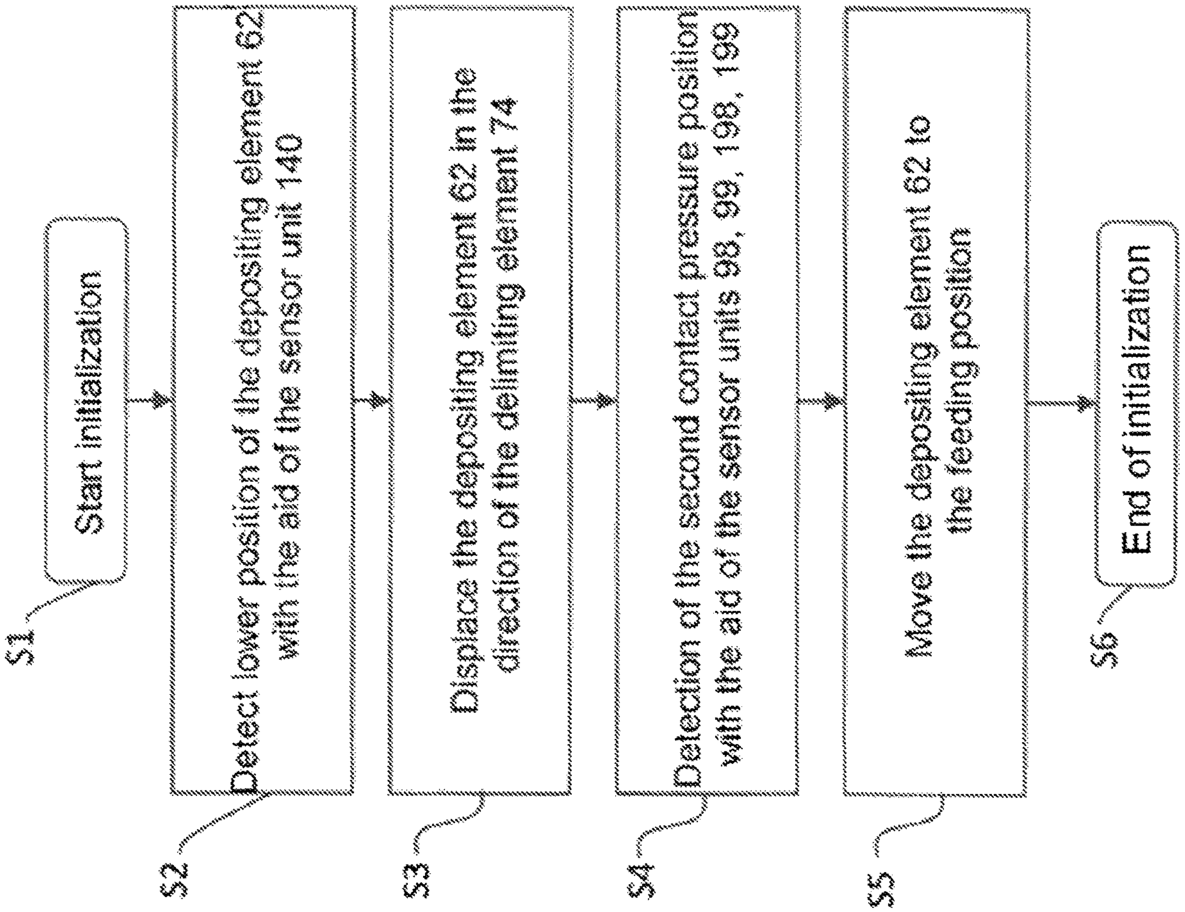
FIG. 22 shows a flow chart of a method for initializing a bill dispensing unit as per one of FIGS. 2 to 21.

FIG. 22 shows a flow chart of a method for initializing the bill dispensing unit 16, 116 as per one of FIGS. 2 to 21. Proceeding from the flow chart as per FIG. 22, FIG. 23 shows a signal diagram for controlling the initialization of a bill dispensing unit 16, 116 as per one of FIGS. 2 to 21.

The procedure of the initialization is started by step S1. Subsequently, the lower position of the depositing element 62 is detected with the aid of the sensor unit 140. To this end, the depositing element 62 with the aid of the drive unit 96 for moving the depositing element 62 is moved down to the lower position, if required. Subsequently, in step S3 the depositing element 62 with the aid of the drive unit 94 is displaced in the direction of the delimiting element 74. In step S4 it is then checked whether the depositing element 62 is displaced so far in the direction of the delimiting element 74 to the point that the depositing element 62 has deflected the contact pressure elements 96, 97, 196, 197 so far that the sensor units 98, 99, 198, 199 detect the respective interrupter element 214, 215, 114, 115. When both sensor units 98, 99, or 198, 199, respectively, detect a second upper position of the contact pressure units 96, 97, 196, 197, the movement of the depositing element 62 in the direction of the delimiting element 74 is interrupted. In step S5, the depositing element 62 with the aid of the drive unit 94 is subsequently moved by a predetermined distance away from the delimiting element 74 again so that the depositing element 62 is then disposed in the feeding position in which depositing bills in the depositing compartment 72 is possible. The procedure of the initialization is then completed in step S6.

Figure 23:
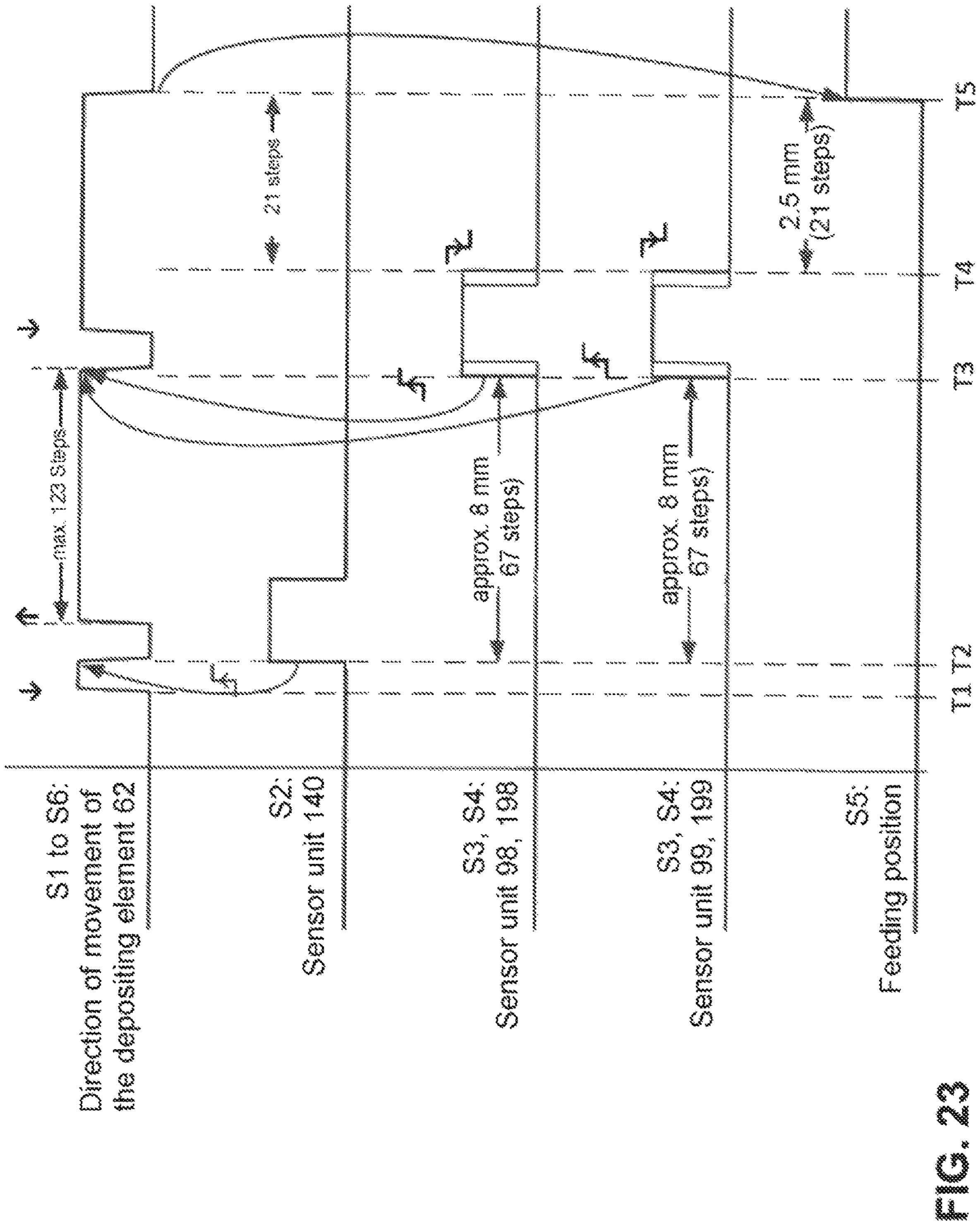
FIG. 23 shows a signal diagram for controlling the initialization according to the sequence as per FIG. 22.

In the signal diagram shown in FIG. 23 the actuation of the drive unit 94 for moving the depositing element 62 is shown in the top line. The signal profile of the sensor unit 140 relevant to step S2 is illustrated in line 2; the signal profile of the sensor units 98, 198 relevant to steps S3 and S4 is shown in line 3; the signal profile of the sensor units 99, 199 relevant to steps S3 and S4 is shown in line 4; and the signal profile of the signal upon reaching the feeding position generated by the control unit 44 is shown in line 5.

At the time T1 the drive unit 94 for moving the depositing element 62 is actuated in such a manner that the depositing element 62 is displaced downward to the lower position. Once it has been detected with the aid of the sensor unit 140 at the time T2 (step S2) that the lower position of the depositing element 62 has been reached, the depositing element 62 with the aid of the drive unit is displaced in the direction of the delimiting element 74 (step S3) until the sensor unit 98, 99, or 198, 199, respectively, each detect a second position of the depositing elements 96, 97, or 196, 197 (step S4) and the movements of the depositing element 62 are stopped at the time T3. Subsequently, the depositing element 62 is moved in the direction of the lower position, away from the delimiting element 74 again. Once the sensor units 98, 99, or 198, 199, respectively, at the time T4 no longer detect the second position of the contact pressure elements 96, 97, 196, 197 at the time T4, the depositing element 62 is moved further downward by a pre-set distance. In the present exemplary embodiment, the latter corresponds to 21 steps of the stepper motor serving as the drive of the depositing element 62. Upon performing the controlled movement at the time T5, the control unit 46 generates a signal which indicates that the depositing element 62 has reached the feeding position for feeding bills into the depositing compartment 72.

The invention claimed is:

1. A device for handling bills comprising:

a bill dispensing unit which includes a dispensing compartment for dispensing bills and a first closure element moveable between a closed position and an open position;

wherein the first closure element in a closed position delimits the dispensing compartment on one side, and wherein the first closure element for opening the dispensing compartment is movable from the closed position to an open position, and for closing the dispensing compartment is movable from the open position to the closed position;

wherein the device further comprises at least one second closure element which is movable between an open position and a closed position; and wherein the second closure element is disposed such that access to bills provided in the dispensing compartment is possible only when the first closure element and the second closure element are both in the respective open positions, a first drive unit for selectively moving the first closure element from the closed position to the open position and from the open position to the closed position; and a second drive unit for selectively moving the second closure element from the closed position to the open position and from the open position to the closed position, at least one first sensor unit configured to detect one of the open position and the closed position of the first closure element at least one second sensor unit configured to detect one of the open position and the closed position of the second closure element;

wherein the at least one first sensor unit generates a first sensor signal when the first closure element is in the open position or in the closed position;

wherein the at least one second sensor unit generates a second sensor signal when the second closure element is in the open position or in the closed position;

wherein the at least one first sensor unit and the second sensor unit respectively transmit the first and second sensor signals to a control unit; and wherein the control unit is configured to actuate the first drive unit and the second drive unit as a function of the transmitted first and second sensor signals, wherein the control unit is configured to control the first drive unit to move the first closure element to the closed position or keep the first closure element in the closed position when the control unit:

actuates the second drive unit to move the second closure element from the open position to the closed position, and has not received the second sensor signal from the second sensor unit after a predetermined temporal interval.

2. The device as claimed in claim 1, wherein the control unit is configured to actuate the first drive unit independently of the second drive unit, and to actuate the second drive unit independently of the first drive unit.

3. The device of claim 1 wherein the first closure element and the second closure element are not mechanically coupled.

4. The device of claim 1 further comprising:

a closure unit, wherein the second closure element in the closed position forms a region of the surface of the closure unit.

5. The device of claim 4 wherein the closure unit further comprises:

an opening which is closed by the second closure element and behind which the bill dispensing unit is disposed.

6. The device as claimed in claim 5 further comprising:

a frame, wherein the bill dispensing unit by way of the frame, is fixedly connected to the closure unit with at least one fastening means.

7. The device of claim 1 further comprising:

at least one guide track, wherein at least one of the first closure element and the second closure element during the movement from the respective closed position to the respective open position and during the movement from the respective open position to the closed position, is guided in the at least one guide track.

8. The device of claim 1 wherein the first closure element is pivotable about a first rotation axis and the second closure element is pivotable about a second rotation axis which is different from the first rotation axis.

9. The device of claim 1 wherein the first closure element and the second closure element are pivotable about a common rotation axis.

10. The device of claim 1 wherein the first closure element in the closed position serves as a detent element for the bills fed individually to the dispensing compartment.

11. The device of claim 1 wherein at least one of the first closure element and the second closure element comprises at least one of a metal layer, a stainless steel layer, and a metal element which has been produced by a die casting method.

12. The device of claim 11 wherein said metal element is one of an aluminum die casting, a zinc die casting, and a magnesium die casting.

13. The device of claim 1 wherein at least one of the first closure element and the second closure element is formed from an electrically conducting plastic material.

* * * * *